US011531009B2

(12) United States Patent
Ozbal

(10) Patent No.: US 11,531,009 B2
(45) Date of Patent: Dec. 20, 2022

(54) SINGLE-USE, DISPOSABLE HIGH-PRESSURE LIQUID CHROMATOGRAPHY COLUMNS FOR HIGH-THROUGHPUT ANALYSIS

(71) Applicant: PureHoney Technologies, Inc., Billerica, MA (US)

(72) Inventor: Can Ozbal, Lexington, MA (US)

(73) Assignee: PureHoney Technologies, Inc., Billerica, MA (US)

( * ) Notice: Subject to any disclaimer, the term of this patent is extended or adjusted under 35 U.S.C. 154(b) by 557 days.

(21) Appl. No.: 16/474,697

(22) PCT Filed: Dec. 28, 2017

(86) PCT No.: PCT/US2017/068805
§ 371 (c)(1),
(2) Date: Jun. 28, 2019

(87) PCT Pub. No.: WO2018/126064
PCT Pub. Date: Jul. 5, 2018

(65) Prior Publication Data
US 2020/0386725 A1    Dec. 10, 2020

Related U.S. Application Data

(60) Provisional application No. 62/440,319, filed on Dec. 29, 2016.

(51) Int. Cl.
*G01N 30/46* (2006.01)
*B01J 20/281* (2006.01)
(Continued)

(52) U.S. Cl.
CPC ......... *G01N 30/467* (2013.01); *G01N 30/482* (2013.01); *G01N 30/603* (2013.01);
(Continued)

(58) Field of Classification Search
None
See application file for complete search history.

(56) References Cited

U.S. PATENT DOCUMENTS 4,270,921 A    6/1981 Graas
4,451,365 A    5/1984 Saettler
(Continued)

FOREIGN PATENT DOCUMENTS

DE    202016103304 U1    9/2016
WO    WO 2007022026 A2    2/2007
(Continued)

*Primary Examiner* — Daniel S Larkin
(74) *Attorney, Agent, or Firm* — Mintz Levin Cohn Ferris Glovsky and Popeo, P.C.

(57) ABSTRACT

A device for separating one or more molecules of interest in a liquid specimen including a monolithic body defining a fractionation column. The column includes an inlet opening at a proximal end of the fractionation column; an outlet opening at a distal, opposite end of the fractionation column; a solid phase chamber positioned between the inlet opening and the outlet opening; a specimen introduction area adjacent a proximal end of the solid phase chamber; an analyte exit area adjacent a distal end of the solid phase chamber; an inlet chamber adjacent the inlet opening that tapers into the specimen introduction area; and an outlet chamber that extends from the analyte exit area to the outlet opening. A metered amount of solid phase packed within the solid phase chamber between a first porous frit and a second porous frit of the solid phase chamber.

20 Claims, 16 Drawing Sheets

(51) Int. Cl.
  G01N 30/60    (2006.01)
  G01N 30/74    (2006.01)
  G01N 30/80    (2006.01)
  G01N 35/00    (2006.01)
  G01N 30/02        (2006.01)
  G01N 30/00        (2006.01)

(52) U.S. Cl.
  CPC ....... G01N 30/606 (2013.01); G01N 30/6043 (2013.01); G01N 30/6091 (2013.01); G01N 30/74 (2013.01); G01N 30/80 (2013.01); G01N 35/00732 (2013.01); G01N 2030/027 (2013.01); G01N 2030/484 (2013.01); G01N 2035/00752 (2013.01); G01N 2035/00762 (2013.01); G01N 2035/00772 (2013.01)

(56)         References Cited

U.S. PATENT DOCUMENTS

| 5,863,428 | A  | * | 1/1999  | Ma ................ B01D 15/22 |
|           |    |   |         | 96/101                         |
| 5,918,273 | A  |   | 6/1999  | Horn                           |
| 2002/0043489 | A1 |  | 4/2002  | Myogadani                      |
| 2007/0084982 | A1 |  | 4/2007  | Martone et al.                 |
| 2010/0154207 | A1 |  | 6/2010  | Ford et al.                    |
| 2015/0377842 | A1 |  | 12/2015 | Ozbal                          |

FOREIGN PATENT DOCUMENTS

| WO | WO 2007089397 A1 | 8/2007  |
| WO | WO 2017199335 A1 | 11/2017 |

\* cited by examiner

SINGLE-USE, DISPOSABLE HIGH-PRESSURE LIQUID CHROMATOGRAPHY COLUMNS FOR HIGH-THROUGHPUT ANALYSIS

CROSS-REFERENCE TO RELATED APPLICATION

This application claims the benefit of priority under 35 U.S.C. § 119(e) to U.S. Provisional Patent Application Ser. No. 62/440,319, filed Dec. 29, 2016, entitled "Single-Use, Disposable High-Pressure Liquid Chromatography Column." The disclosure of the provisional application is incorporated by reference in its entirety.

FIELD

The subject matter described herein relates to systems, apparatus, methods, and kits related to single-use, disposable high-pressure liquid chromatography columns for high-throughput analysis of liquid samples of small volume.

BACKGROUND

Detection of specific chemical species in liquid solutions can be a complicated task in which an array of analytical equipment is used. In some instances, using a marker, such as luminescent or radioactive markers, which identify the target species, or analyte, can lack precision or sensitivity. Increasingly, mass spectrometry (MS) with an atmospheric pressure ionization (API) source is used by those seeking to quantify one or more analytes in a complex liquid solution. Mass spectrometric analysis requires that the sample be ionized, meaning the species in the sample have a mass and a net charge, either positive or negative. The atmospheric pressure ionization source converts charge-neutral analytes into ions in the gas phase that can be analyzed with mass spectrometry.

An atmospheric pressure ionization source can achieve ionization of species in a liquid sample in various ways. Some of the most common techniques are electrospray ionization (ESI) and atmospheric pressure chemical ionization (APCI). These techniques each involve atomizing the sample by expelling the sample liquid through a narrow tube while heating the tube. Droplets of the sample liquid evaporate into the constituents of the sample, including the target chemical species. As the evaporated constituents of the sample travel from the narrow tube towards the mass spectrometer inlet, they travel through a large electrical potential and become ionized.

Mass spectrometric analysis is useful in quantifying medications or toxins in biological samples like blood, urine, or tissue extracts, as well as monitoring pesticides or pollutants in food or water. These types of sample solutions may contain high concentrations of salts or buffers, such as pH buffers, and these buffers make the ionization of analytes using electrospray ionization (ESI) or atmospheric pressure chemical ionization (APCI) highly inefficient. This effect is known as ion suppression and is the direct result of excess salt, instead of the analytes of interest, becoming ionized. Currently, analysts using mass spectrometry (MS) fractionate complex samples prior to MS analysis, effectively separating out much of the analytes of interest from the salts or buffers prior to ionization.

Fractionation of complex mixtures of liquid specimens is typically done by liquid chromatography (LC), most often high-pressure (or high-performance) liquid chromatography (HPLC) to facilitate the detection of one or more selected analytes. While there are a wide variety of protocols and approaches for performing HPLC, the technique generally involves passing a liquid specimen over a solid phase. Various analytes are bound or adsorbed to the solid phase based on the chemical properties of each analyte (e.g. ionic or hydrophobic interactions) while other components of the mixture are not bound to the solid phase. The bound analytes can be partitioned from the solid phase to the liquid phase by manipulating the chemical properties of the liquid phase. The fractionation of complex mixtures can also be accomplished based on the molecular weight (or size) of the analytes in the mixture using a technique called size-exclusion chromatography (SEC) through the use of solid phase that retards the flow of certain size analytes relative to others.

Analysts use various chromatography media, solvents, additives and temperature to optimize the fractionation of analytes from interferents, such as salts and buffers. HPLC generally requires the use of a sensor(s) to detect, qualitatively or quantitatively, the various analytes of interest as they are fractionated and eluted off the HPLC column. The sensors use one or more of the chemical properties of the analytes for detection. The chemical properties of the analyte used for detection by the sensor may include one or more of absorption of light at a specific wavelength, fluorescence, or luminescence of the analyte at a specific wavelength upon excitation at a different wavelength, the electrochemical properties, radioactivity, the mobility of an analyte in an electrical field or drift tube or the molecular weight of the analyte (i.e., mass spectrometry). The direct coupling of HPLC fractionation to mass spectrometric (MS) analysis is known as HPLC-MS.

Commercial systems for HPLC-MS can be large, complicated systems. Conventional commercial systems can include high-pressure liquid pumps, two or more solvent reservoirs, a solvent mixer to create the needed gradients in the solvent ratio, a valve or other sample introduction mechanism, a chromatography column for performing the fractionation, and a detector, which in the case of HPLC-MS is a mass spectrometry detector. The complexity of commercial HPLC-MS systems can vary and such systems may have the ability to perform at different pressures, may include automated sample introduction, may include temperature controls, and may include additional optical detectors, for example those capable of measuring light absorbance, fluorescence, or light scattering from a liquid sample.

When using a commercial HPLC-MS system, the user should have some degree of skill or knowledge to obtain accurate and reliable results. The user optimizes each analysis through multiple decisions, such as by selecting the correct chromatography media and solvents, though other variables can be controlled, such as temperature, pressure, sample size, and detection instrument parameters. Optimization depends not only on the nature of the sample, but also on the target species, or analyte. Detection of an analyte in blood can be very different from detecting the same analyte in urine in that the optimal conditions for HPLC fractionation may not be the same. The chromatography media that a skilled user selects may change according to the contents of the sample, and the solvents the skilled user selects need to be compatible with the ionization process for mass spectrometric analysis.

Commercial HPLC-MS systems may include two solvents (though one solvent of varying concentration can be used), a wash solvent and an elution solvent, being prepared for each analysis or batch of analysis. A skilled user prepares the solvents in concentrations appropriate for the sample and the selected chromatography media. It is typically the case that the ratio between the wash and elution solvents changes over time during fractionation, and in commercial systems, a skilled user may oversee this change in ratio between the solvents, which can also be thought of as a gradient in relative concentration in the solvents. The reason for this gradient, or change in ratio, in the solvents is that analytes and contaminants have differential affinity for the chromatography media as compared to the elution solvent. In most cases, analytes are preferentially bound onto the chromatography media in the presence of wash solvent, but as the relative amount of elution solvent is increased, the analyte will eventually become unbound from the chromatography media and flow out of the system with the elution solvent. The skilled HPLC-MS user understands the chemical properties of the analytes in each sample and selects appropriate HPLC conditions, including the wash and elution solvents and their relative concentration during fractionation, to obtain sufficient distinction between the contaminants in a sample and the desired analytes so that each can be detected.

The chromatographic columns used in commercial HPLC systems are quite large and designed for reuse. Since the media in the chromatographic columns are selected for different types of fractionation, multiple columns will often be associated with a commercial HPLC system. The size of the columns used in commercial HPLC systems can require a large amount of sample, as well as a large volume of solvents. Additionally, the intended long lifetime of the chromatographic columns means that they are used multiple times, and so the skilled user, or analyst, needs to be cognizant of what the columns were used for in the past in order to determine the veracity of the results he or she obtains.

In many applications, such as drug discovery and development, environmental testing, and diagnostics, there is a need to analyze a large number of samples in an efficient and reproducible manner. Many of the techniques used to analyze fluidic samples require that the samples be tested in a serial manner. In such applications, the process of serial analysis can be automated through the use of a computer-controlled robotics and automation. Such devices are generally called auto-injectors and are commonly interfaced to all manner of serial analysis systems including, but not limited to, chromatography systems, mass spectrometers, and spectroscopic detectors. Although various improvements have been made to increase through-put, the serial nature and rate-limiting fractionation step limits the use of HPLC-MS as a practical drug discovery and quality control tool.

SUMMARY

In an aspect, disclosed is a device for separating one or more molecules of interest in a liquid specimen. The device includes a monolithic body defining a fractionation column. The column includes an inlet opening at a proximal end of the fractionation column; an outlet opening at a distal, opposite end of the fractionation column; a solid phase chamber positioned between the inlet opening and the outlet opening; a specimen introduction area adjacent a proximal end of the solid phase chamber; an analyte exit area adjacent a distal end of the solid phase chamber; an inlet chamber adjacent the inlet opening that tapers into the specimen introduction area; and an outlet chamber that extends from the analyte exit area to the outlet opening. A metered amount of solid phase is packed within the solid phase chamber between a first porous frit positioned near the proximal end of the solid phase chamber and a second porous frit positioned near the distal end of the solid phase chamber.

The device can be a single-use disposable device configured for high pressure liquid chromatography. The monolithic body can be machined, cast, molded, and/or 3D-printed to define the fractionation column. The monolithic body can be formed of metal, resin, polymer, or a combination thereof. The monolithic body can be formed of a bio-inert polymeric material that is polyetheretherketone (PEEK), polypropylene, or polystyrene.

The monolithic body can define a plurality of fractionation columns. The plurality of fractionation columns can be arranged linearly, circularly, or two-dimensionally. The plurality of fractionation columns can be arranged in a linear array of up to about 24 columns. The plurality of fractionation columns can be configured to separate the one or more molecules of interest simultaneously into a plurality of fractions collected in a plurality of collection wells. The plurality of collection wells can be arranged in an array of at least 96 wells in a microtiter plate.

The specimen introduction area can receive a pipetted volume of the liquid specimen to be fractionated. The volume of liquid specimen can be between 0.1 uL and 20 uL.

The first and second porous frits can constrain the solid phase within solid phase chamber. The solid phase chamber can be cylindrical and the first and second porous frits can be disc-shaped. The solid phase chamber can have an inner diameter configured to receive the outer diameters of each of the first and second porous frits. The outer diameter of the first and second porous frits can be larger than the inner diameter of the solid phase chamber where the first and second porous frits are positioned. The first and second porous frits can be press-fit within the solid phase chamber. The monolithic body can be formed of a material that is different in hardness compared to a material of the first and second porous frits. The material of the monolithic body can be plastic and the material of the first and second porous frits cam be metal. The first and second porous frits can be held in place within the solid phase chamber through a radially compressive force applied by the inner diameter of the solid phase chamber.

The device can further include one or more readable codes positioned on a surface of the monolithic body. The one or more readable codes can be machine readable codes, quick response (QR) codes, bar codes, electronic RFID codes, electromagnetic codes, color codes, or a combination thereof. The one or more readable codes can identify a solvent assembly as compatible with the device.

The inlet chamber can receive a proximal fluidic coupler and the outlet chamber is configured to receive a distal fluidic coupler, the proximal and distal fluidic couplers being part of an High Performance Liquid Chromatography (HPLC) system. The proximal and distal fluidic couplers can support the first and second porous fits under elevated pressure applied by the HPLC system. A compression force applied by the proximal and distal fluidic couplers can create a seal with the inlet and outlet chambers there by preventing leakage during use of the device with the HPLC system. Inserting the proximal fluidic coupler and distal fluidic coupler into the inlet chamber and outlet chamber, respectively, can create a non-threaded sealed coupling between the fractionation column and the HPLC system.

In an interrelated aspect, disclosed is a system for separating one or more molecules of interest in a liquid specimen. The system includes a pumping system having a stage actuatable in a linear, bi-directional manner; a proximal fluidic coupler coupled to the stage; and a distal fluidic coupler coupled to the stage. The system further includes a monolithic body defining a fractionation column. The column includes an inlet chamber at a proximal end of the fractionation column configured to be in fluid connection with the pumping system via the proximal fluidic coupler; an outlet chamber at a distal, opposite end of the fractionation column configured to be in fluid connection with the pumping system via the distal fluidic coupler; and a solid phase chamber extending between the inlet chamber and the outlet chamber packed with a metered amount of solid phase between a first porous frit and a second porous frit. The stage is actuatable between a first, load position and a second, engaged position. The first, load position is characterized by the proximal and distal fluidic couplers removed from the inlet and outlet chambers of the fractionation column. The second, engaged position is characterized by the proximal and distal fluidic couplers in sealed engagement with the inlet and outlet chambers of the fractionation column.

The stage can be manually actuatable, electronically actuatable, or both. The stage can move the proximal and distal fluidic couplers away from one another when in the first, engaged position releasing the monolithic body from sealed engagement. The stage can move the proximal and distal fluidic couplers towards one another when in the second, engaged position capturing the monolithic body into the sealed engagement. The stage can be programmable to apply a selected amount of compression force. The proximal fluidic coupler can be moved by the stage in a downward direction towards the inlet chamber. The distal fluidic coupler can be moved by the stage in an upward direction towards the outlet chamber. The proximal and distal fluidic couplers can be independently moved by the stage such that at least one of the proximal and distal fluidic couplers is engaged with the monolithic body while the other of the proximal and distal fluidic couplers is removed from the monolithic body.

In an interrelated aspect, disclosed is a system for analyzing one or more molecules of interest in a liquid specimen including a fractionation system. The fractionation system includes a pumping system; a detector having at least one sensor arranged relative to a multichannel flow pathway; a monolithic body defining a plurality of fractionation columns. Each fractionation column includes an inlet chamber at a proximal end of the fractionation column; an outlet chamber at a distal, opposite end of the fractionation column; and a solid phase chamber extending between the inlet chamber and the outlet chamber packed with a metered amount of solid phase between a first porous frit and a second porous frit. The inlet chambers of each of the plurality of fractionation columns are configured to be in fluid communication with the pumping system. The outlet chambers of each of the plurality of fractionation columns are configured to direct eluate from the solid phase chamber toward the multichannel flow pathway of the detector. The system further includes a fraction collector having a plurality of wells; and an actuator operably coupled to the detector and the fraction collector. The actuator is configured to direct flow of the eluate from the multichannel flow pathway of the detector towards the fraction collector based on a level of the one or more molecules of interest detected by the detector.

The monolithic body can be a single-use, disposable device configured for high pressure liquid chromatography. The plurality of fractionation columns defined by the monolithic body can be spaced to match spacing of wells in a standard 96-well microtiter plate. The plurality of fractionation columns defined by the monolithic body can be spaced approximately 9 mm apart. Each of the plurality of fractionation columns can be exposed simultaneously to a single pump gradient of liquid flow from the pumping system. Each inlet chamber of the plurality of fractionation columns can be adjacent an inlet opening to tapers into a specimen introduction area. The specimen introduction area can be adjacent a proximal end of each solid phase chamber and an analyte exit area can be adjacent a distal end of each solid phase chamber. The outlet chamber can extend from the analyte exit area to an outlet opening. The first porous frit can be positioned near the proximal end of the solid phase chamber and the second porous frit can be positioned near the distal end of the solid phase chamber.

The monolithic body can be machined, cast, molded, and/or 3D-printed to define the plurality of fractionation columns. The monolithic body can be formed of metal, resin, polymer, or a combination thereof. The monolithic body can be formed of a bio-inert polymeric material that is polyetheretherketone (PEEK), polypropylene, or polystyrene. The plurality of fractionation columns can be arranged linearly, circularly, or two-dimensionally. The plurality of fractionation columns can be arranged in a linear array of up to about 24 columns.

The system can further include a liquid handling system that samples aliquots of the liquid specimen to be fractionated. The liquid specimen can be contained within a microtiter specimen plate having a plurality of wells. The plurality wells can include 96 wells or 384 wells. The actuator can be configured to move to a first position to direct the flow of the eluate towards a first well of the plurality of wells of the fraction collector when the level of the one or more molecules of interest detected by the detector is at or above a threshold. The actuator can be configured to move to a second position to divert the flow of the eluate towards a waste collector when the level of the one or more molecules of interest detected by the detector is below the threshold. The actuator can be configured to move to a third position to direct the flow of the eluate towards a second well of the plurality of wells of the fraction collector when the level of the one or more molecules of interest detected by the detector is once again at or above the threshold. The threshold can be pre-determined and user-selectable. The detector can detect UV absorption and the threshold can be 0.02 Absorbance Units. The plurality of wells of the fraction collector can be independently addressable. The fraction collector can be movable by the actuator. The fraction collector can be a microtiter plate, and the plurality of wells can be arranged in an array of at least 96 wells in the microtiter plate.

A plurality of tubes can extend from the multichannel flow pathway of the detector, the plurality of tubes coupled to the actuator. A position of the plurality of tubes relative to a position of the plurality of wells of the fraction collector can be independently articulated by the actuator. A position of the plurality of wells of the fraction collector relative to a position of the plurality of tubes can be independently articulated by the actuator. The actuator can be configured to independently articulate at least one of the fraction collector and the plurality of tubes. The actuator can be an electromechanical arm.

The system can further include one or more controllers in operable communication with the fractionation system. The system can further include an analysis system having an analyzer configured to assay fractions contained within the fraction collector, the one or more controllers in operable communication with the analyzer. The analyzer can be a mass spectrometer. Data from the mass spectrometer can be collected independent of data collected from the fractionation system.

The system can further include one or more codes positioned on one or more of a specimen plate containing the liquid specimen to be fractionated, the monolithic body defining the plurality of fractionation columns, and the fraction collector. The one or more codes can be machine readable codes, quick response (QR) codes, bar codes, electronic RFID codes, electromagnetic codes, color codes, or a combination thereof. The one or more controllers can track and record the one or more codes of the specimen plate and the fraction collection plate, the identity of individual wells of the specimen plate and the fraction plate, and fraction retention time based on triggering of the detector by the eluate. Data from the one or more controllers can be merged via software to create integrated data for a single fraction of the liquid specimen.

In an interrelated aspect, disclosed is a device for separating one or more molecules of interest in a liquid specimen, the device including a monolithic body defining a fractionation column.

In an interrelated aspect, disclosed is a system for separating one or more molecules of interest in a liquid specimen, the system including a pumping system having an actuatable stage linearly movable relative to a fractionation column to complete a sealed fluidic circuit of the system.

In an interrelated aspect, disclosed is a system for analyzing one or more molecules of interest in a liquid specimen, the system including a fractionation system having an array of fractionation columns within a multiplexed, disposable cartridge and an independently-addressable fraction collector. The system is configured to collect multiplexed high performance liquid chromatography data decoupled from mass spectrometry data.

In some variations, one or more of the following can optionally be included in any feasible combination in the above methods, apparatus, devices, and systems. More details of the methods, apparatus, devices, and systems are set forth in the accompanying drawings and the description below. Other features and advantages are apparent from the following description and drawings.

BRIEF DESCRIPTION OF THE DRAWINGS

These and other aspects will now be described in detail with reference to the following drawings. Generally speaking, the figures are not to scale in absolute terms or comparatively, but are intended to be illustrative. Also, relative placement of features and elements may be modified for the purpose of illustrative clarity.

Figure 1:
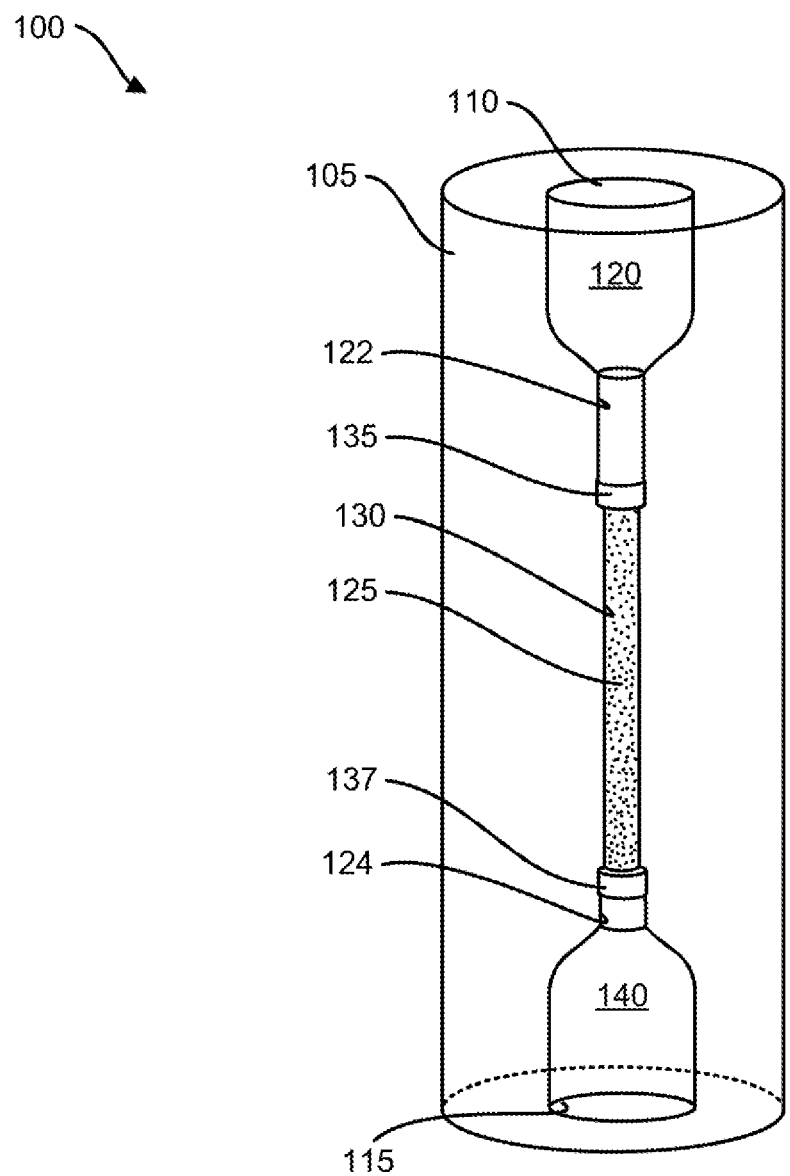
FIG. 1 is a perspective view of an implementation of a single-use, disposable chromatography column.

It should be appreciated that the drawings are for example only and are not meant to be to scale. It is to be understood that devices described herein may include features not necessarily depicted in each figure. Like labels are used to refer to same or similar items in the drawings.

DETAILED DESCRIPTION

Described herein are apparatuses, systems, kits, devices, and methods of using single-use, disposable chromatography columns for mass spectrometric (MS) analysis. As will be described in more detail below, the single-use, disposable columns can increase the speed and efficiency of obtaining HPLC-MS results in a hospital setting, which is particularly crucial for time-sensitive analyses. The systems, kits, devices, and methods provided herein can eliminate the need for highly skilled users while resulting in fewer errors. Further, the systems, kits and devices described herein can be manufactured more efficiently and more cheaply allowing for cost-effective, single-use applications.

As described elsewhere herein, HPLC involves pumping a sample mixture or analyte in a solvent (known as the mobile phase) at high pressure through a column with chromatographic packing material (known as the solid phase or stationary phase). The primary components of most HPLC systems are the pump, the injector, the column, and the detector. The pump propels the mobile phase through the chromatograph at a specific flow rate and pressure. The injector via a valve system serves to introduce the liquid specimen into the flow stream of the mobile phase without disturbing the column packing. The solid phase within the column separates the sample components using various physical and chemical properties. One end of the column is in fluidic connection with the pump and injector where the specimen is introduced. The opposite end of the column is in fluidic connection with the detector.

Typical HPLC systems operate at pressures of 50-400 bar, while commercially available ultra-high pressure liquid chromatography can be operated at pressures up to 800 bar. These high pressures required for HPLC have conventionally required specialized pumps, valve systems, columns, and fluidic fittings. For example, the injector used for the introduction of a fluidic specimen to conventional HPLC column incorporate a rotary valve. This allows for the introduction of a specimen, which is at atmospheric pressure (e.g. 1 bar), to the HPLC column, which is at elevated pressures (e.g. 100-400 bar). The specimen is loaded into an injection loop within the valve, often by an automated device such as an auto-injector, and maintained at atmospheric pressure until the valve is actuated. Upon actuation of the valve, a metered volume of the specimen contained within the sample loop is brought into fluidic communication with the high-pressure flow over the conventional HPLC column and the specimen is introduced into the column. As will be described in more detail below, the single-use, disposable columns described herein eliminate the need for the complex injector for the introduction of a specimen.

Conventional HPLC columns are typically constructed from stainless steel. The columns also include specialized fittings at either end for tooled fluidic connections to the other components of the HPLC system. Conventional HPLC columns typically cost several hundred to thousands of dollars. The conventional columns are designed for the fractionation of many hundreds of specimens before being replaced due to deteriorating performance. Because the conventional HPLC columns are expensive and intended to be used again and again, the preparation of the sample prior to introduction to the sample loop is critical.

Conventional, multi-use HPLC columns can suffer from carry-over. When analyzing a plurality of specimens by HPLC all traces of analyte must be removed from the column prior to the analysis of each specimen. Traces of analyte that remain in the column can result in erroneous results when the same column is used for the analysis of the next specimen. This can be an issue where the same column is used for one analysis where a particular analyte is present in high levels and an analysis where the analyte is present in low levels. Carry-over is of particular concern in the analysis of medical or forensic samples where accuracy of the measurement is critically important and the detection of even trace levels of an analyte can have significant implications. The columns described herein are low-cost and disposable such that they can be particularly useful in these scenarios. A new column can be used for every specimen thereby improving data accuracy and reliability.

Minimization of carry-over in HPLC analysis of conventional columns typically includes washing the entire HPLC flow path with a liquid phase in which the analyte(s) of interest are soluble. For example, in reversed-phase HPLC the entire system may be washed with an organic solvent in an attempt to remove all traces of the analyte. In certain cases, one or more "blank" injections (i.e., injections that do not contain a specimen) may be required to clean fully the system. Carry-over is compounded by the highly sensitive sensors that are able to detect trace levels of the analyte. Analyzing a plurality of specimens sequentially can be problematic when some specimens contain analyte at much higher levels than others do. The requirement to clean fully the conventional HPLC column of traces of an analyte prior to the analysis of the next specimen increases analysis times for each specimen. For example, in a reversed-phase HPLC analysis an analyte of interest may elute from the solid-phase in the conventional HPLC column when washed with liquid containing 60% organic solvent. Once the analyte is eluted from the column and is detected by the sensor, the HPLC system is flushed with 100% organic solvent to remove traces of the analyte. In many cases, the flushing process can take longer than the actual analysis of the specimen. The single-use, disposable columns described herein eliminate the requirement for extensive flushing of the system and can allow for rapid analysis of multiple samples.

Specimens to be analyzed by conventional HPLC columns need to be prepared to ensure that they are amenable to analysis by HPLC. For example, serum or plasma specimens contain high concentrations of protein (~50 mg/mL of albumin) can create challenges for HPLC analysis. If a serum or plasma specimen is to be analyzed by reversed-phase HPLC, substantially all of the protein in that specimen must first be removed. The protein in the specimen will aggregate and precipitate in the presence of the organic solvents used to desorb and elute the analytes from the conventional HPLC column. Precipitates in the column can quickly clog the small pores in the HPLC column and frits that maintain the solid-phase within the column resulting in higher operating pressures and poor fractionation. Furthermore, it is very difficult to re-solubilize a precipitated protein. Thus, once a specimen with high levels of protein is introduced to a conventional column it must be replaced. Thus, the single-use, disposable columns described herein are particularly useful for analyzing specimens having concentrations of protein. This also allows for the minimization or complete elimination of sample preparation prior to HPLC fractionation saving both time and expense of sample analysis.

Figure 2:
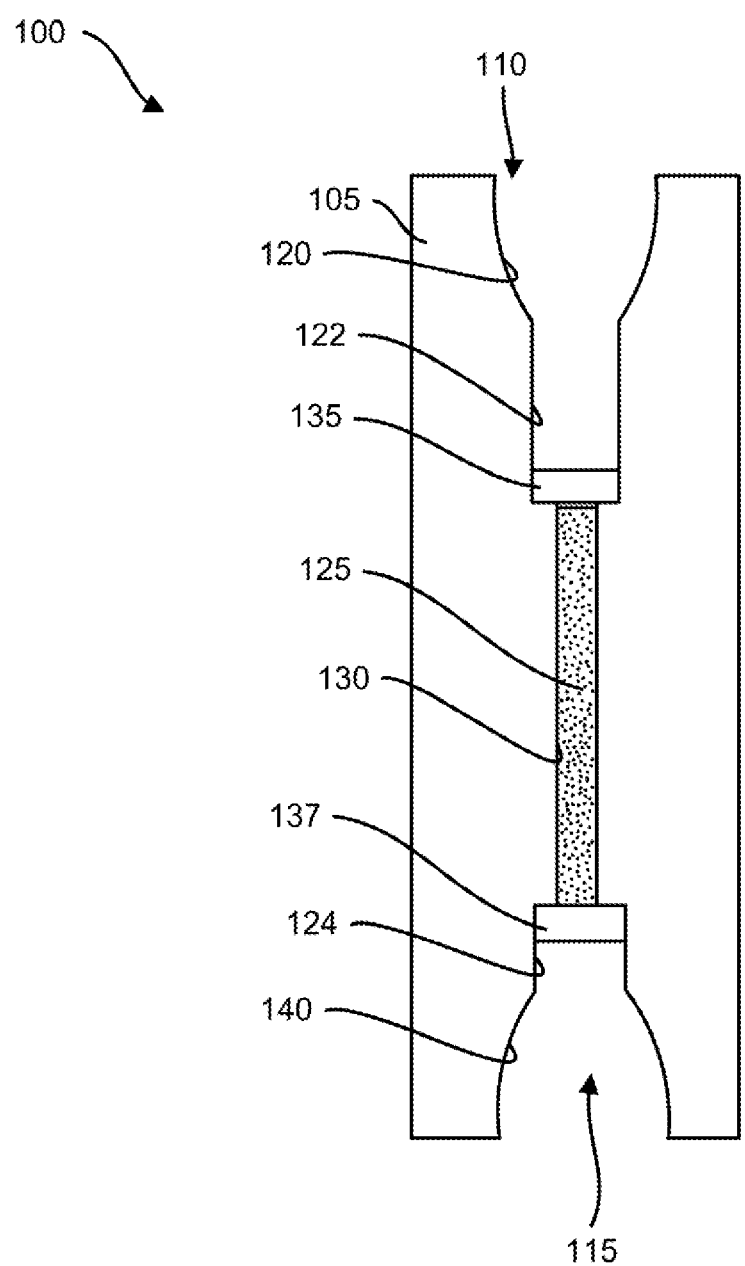
FIG. 2 is a side view of the column of FIG. 1.
Figure 3:
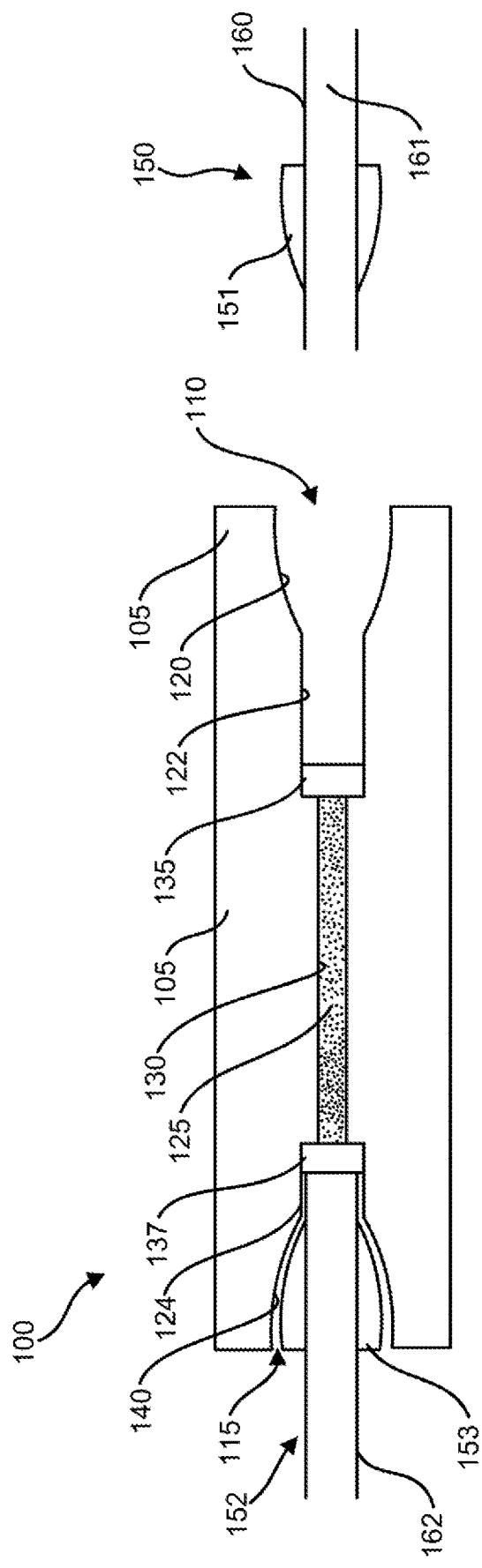
FIG. 3 is a side view of an implementation of a single-use, disposable chromatography column engaged with a distal fluidic connector of an HPLC system.
Figure 4:
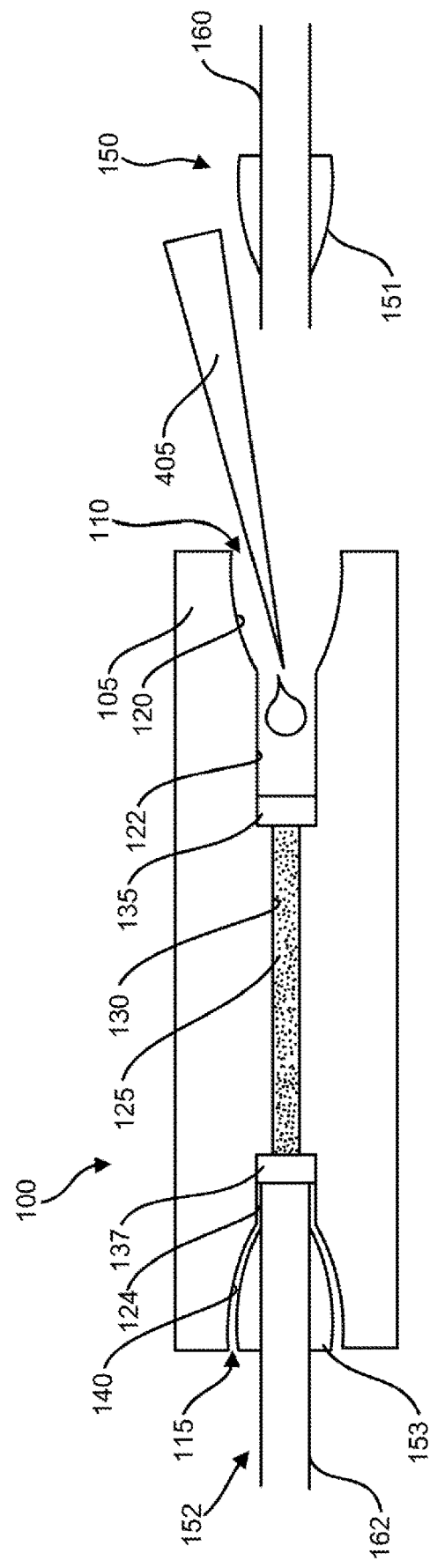
FIG. 4 is a side view of the column of FIG. 3 illustrating application of a specimen to the column.
Figure 5:
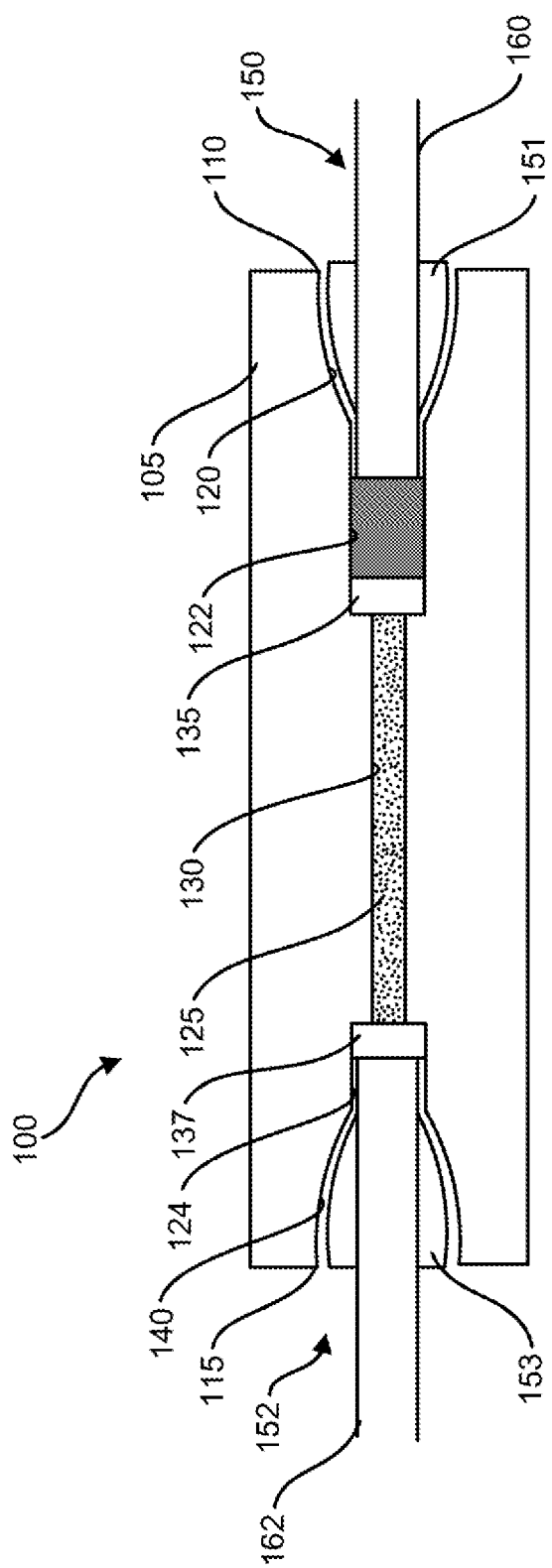
FIG. 5 is a side view of the column of FIG. 4 upon coupling of the proximal fluidic connector of an HPLC system.

Now with respect to the drawings, FIGS. 1-2 illustrate an implementation of a low-cost, single-use disposable analytical column 100 configured to fractionate a single specimen by HPLC systems. The column 100 can include a hollow, cylindrical body 105 having an inlet opening 110 at a proximal end of the body 105, an outlet opening 115 at a distal, opposite end of the body 105, and a metered amount of solid phase 125 packed therebetween. The inlet opening 110 can have a first diameter and open into an inlet chamber 120 configured to receive a fluidic coupler 150, as shown in FIGS. 3-5 and as will be described in more detail below. The inlet chamber 120 can be funnel-shaped or otherwise taper down to a smaller-dimensioned specimen introduction area 122. The specimen introduction area 122 can be a cylindrically-shaped region configured to receive a particular volume of liquid specimen therein. The specimen introduction area 122 is configured to receive sample directly with a pipette tip or other type of disposable injection device inserted through the inlet opening 110 when the fluidic coupler 150 is withdrawn from engagement with the inlet chamber 120. The solid phase 125 can be packed within a cylindrical chamber 130 defined by an inner diameter of the column body 105. The cylindrical, solid phase chamber 130 can extend between a first porous frit 135 at its proximal end (or at a distal end of the specimen introduction area 122) and a second porous frit 137 at its distal, exit end to retain the solid phase 125 within the solid phase chamber 130. Downstream of the second porous frit 137 can be a cylindrically shaped region or analyte exit area 124. The analyte exit area 124 opens into an outlet chamber 140 at the distal end of the column body 105. The outlet chamber 140, like the inlet chamber 120, can be funnel-shaped or tapered such that the smaller diameter analyte exit area 124 is in fluid communication with the larger diameter outlet opening 115. The outlet opening 115 is configured to receive a fluidic coupler 152, as shown in FIGS. 3-5 and as will be described in more detail below. Fluidic coupler 152 is shown engaged in the outlet chamber 140 while fluidic coupler 150 is disengaged from the inlet chamber 120 (see FIGS. 3 and 4). It should be appreciated that both can be disengaged from their respective chambers 120, 140 during application of the specimen into the specimen introduction area 122. As will be described in more detail below, the column body 105 can be machined, cast, molded, and/or 3D-printed such that a monolithic, unitary piece of material defines the body 105 including at least the inlet opening 110, inlet chamber 120, specimen introduction area 122, solid phase chamber 130, analyte exit area 124, outlet chamber 140, and outlet opening 115. Conventional columns typically are formed of multiple components that must be glued or welded together. Coupling components creates seams or junctions within the column that tend to leak when high pressure is applied.

Forming the column body 105 as a monolithic, unitary piece of material that defines the fractionation column thereby avoids the need for couplings, such as gluing parts together, providing for a more robust column body 105 that is less likely to leak or fail during use and upon application of high pressures.

Various physical and chemical properties of the column 100 can be altered to optimize the fractionation of a particular specimen, such as the dimensions of the solid phase chamber 130 as well as the size and chemical composition of the solid phase 125. The internal diameter (ID) of the solid phase chamber 130 can vary, for example, including larger uniform ID (over 10 mm), analytical scale columns (e.g., 4.6 mm), narrow-bore columns (e.g., 1-2 mm), and capillary columns (e.g. under 0.3 mm). In some implementations, the dimensions of the solid phase chamber 130 can be between 2.1 mm-4.6 mm in inner diameter and in the range of 10-100 mm in length.

The size and chemical composition of the solid phase 125 or the chemical composition of the surface coating of the solid phase particles can be altered to optimize the fractionation of a particular specimen. Any of a variety of different particles or resin can make up the solid phase 125 and can depend on the specific fractionation that is desired. The solid phase 125 can include silica gel, charcoal, alumina, polymer, or other particles or resin. The solid phase 125 can be sized from the micron ranges (e.g., 2-50 um) up to larger particle sizes (e.g., 5 cm up to greater than 30 cm). In reversed-phase HPLC, the solid phase 125 is typically beads of silica ranging in diameter from 1-50 micrometers. The solid phase 125 may be porous or solid in nature. Porous particles can provide a greater surface area and the pore size can vary depending on the analyte of interest. The surface of the particles can be modified to provide a hydrophobic or waxy surface to which non-polar analytes will be selectively adsorbed if dissolved in a polar liquid. The solid phase 125 can be compacted axially and radially within the cylindrical, solid phase chamber 130 between the porous frits 135, 137 at a pressure not exceeding the crush resistance of the particulate material.

The porous frits 135, 137 positioned at either end of the solid phase chamber 130 constrain the solid phase 125 within the interior of the column 100. The frits 135, 137 can be sintered elements having pores or openings. The porosity of the frits 135, 137 can vary, but is generally sufficient to retain the solid phase 125 within the chamber 130 while simultaneously allowing the flow of liquid and analytes through. The porosity of the entrance frit 135 can be the same or different from the porosity of the exit end frit 137. Generally, the porosity for both frits 135, 137 is sufficient to retain the particle size of the solid phase 125. In some implementations, the porosity can be about 2 microns. In some implementations, the frit 135 is identical to frit 137 in terms of its various parameters such as porosity, size, thickness, etc. The porous frits 135, 137 can be manufactured from metal (e.g. stainless steel or titanium), polymer or sintered glass. Each of the porous frits 135, 137 can be a disc-shaped element press-fit into place within the hollow cylindrical body 105. The proximal porous frit 135 can be press-fit into a region immediately adjacent to the specimen introduction area 122 and a proximal end of the chamber 130. The distal porous frit 137 can be press-fit into a region immediately adjacent the distal end of the solid phase chamber 135 and the analyte exit area 124. The press-fit attachment of the frits 135, 137 to the column body 105 is sufficient to retain the solid phase 125 within the chamber 130. Adhesives or fasteners can also be implemented to retain frits 135, 137 in place, press-fitting the frits 135, 137 provides an advantage in ease of manufacturing and is preferred.

The inner diameter of the locations where the frits 135, 137 seat within the specimen introduction area 122 and analyte exit area 124, respectively, can be slightly smaller than the outer diameter of the respective frits 135, 137. This allows for the fits 135, 137 to be held in place through a radially compressive force applied by the regions of the column body 105. The column body 105 can be formed of a material that is different in hardness compared to a material of the frits 135, 137. For example, the column body 105 can be formed of plastic and the frits 135, 137 can be formed of a metal, such as stainless steel. Because the frits 135, 137 can have a slightly larger outer diameter than the inner diameter of the location of the column body 105 within which the frits are mechanically pressed into place the harder stainless steel of the frits 135, 137 can deform slightly the softer plastic of the column body 105. This press-fit engagement between the frits and the column body is strong enough to ensure the solid phase 125 stays in place, for example, during shipment and storage of the column 100.

To fractionate a sample, the column 100 is coupled to a high-pressure pumping system and reservoirs of wash and elution solvents on an inlet end by a proximal fluidic coupler 150. The column 100 is coupled to a sensor on an outlet end by a distal fluidic coupler 152 therein completing a fluidic circuit between the HPLC pumping system and the column 100. The sensor is able to detect and/or quantify specific analytes within the specimen (e.g. UV absorption, fluorescence, radioactivity, ion mobility, mass spectrometry, etc.). It should be appreciated that the columns 100 described herein can be used with various detection technologies including absorption, fluorescence, mass spectrometry, ion mobility, or other similar technologies. Where the columns are described herein as being useful for HPLC-MS, it should be appreciated that they are not limited as such. Upon the presence of high pressures (e.g. 100-400 bar) during fractionation, the fluidic couplers 150, 152 on the proximal and distal ends of the column 100 support the press-fit attachment of the frits 135, 137, respectively and maintain the solid phase 125 within the chamber 130. Upon coupling the column 100 to the HPLC system, the presence of the fluidic couplers 150, 152 within the chambers 120, 140 lock the frits 135, 137 in place thereby preventing them from becoming dislodged upon application of high pressures (see FIGS. 3-5). Thus, the press-fit frits, particularly the exit end frit 137 is supported or locked in place once the fluidic circuit is completed and elevated pressures are applied to cause fluidic flow through the solid phase 125.

Again with respect to FIGS. 3-5, the proximal fluidic coupler 150 can have a ferrule 151 sized to be inserted through the inlet opening 110 and positioned within the inlet chamber 120. The distal fluidic coupler 152 can have a ferrule 153 sized to be inserted through the outlet opening 115 and positioned within the outlet chamber 140. Each of the ferrules 151, 153 can have a shape that substantially corresponds to the shape of the chamber 120, 140 within which the ferrule 151, 153 is to mate. In some implementations, the shape is funnel-shaped such that with advancement of the ferrule 151, 153 into the chamber 120, 140 the ferrule 151, 153 wedges into interference fit with the chamber 120, 140.

The couplers 150, 152 can be integral with LC, HPLC, or UHPLC system. In some implementations, the couplers 150, 152 can be installed on an automated column changer having a mechanically actuated stage configured to move one or both of the couplers 150, 152 in a linear, bi-directional manner. For example, the stage can move the couplers 150, 152 towards one another to engage a column 100 positioned therebetween or move the couplers 150, 152 away from one another to release the installed column 100 from engagement with one or both of the couplers 150, 152. The stage on the system can be actuated such that the couplers 150, 152 move independently. Independent movement of the couplers 150, 152 by the stage allows one coupler (e.g. 152) to remain engaged with the column 100 while the other coupler (e.g. 150) is removed. The stage can be actuated and/or programmed to apply a selected amount of pressure or compression force between the couplers 150, 152. The stage can be actuated manually, such as by a user to urge the couplers together or away. The stage can also be controlled electronically such as by software to achieve movement and the selected compression force.

Figure 9A:
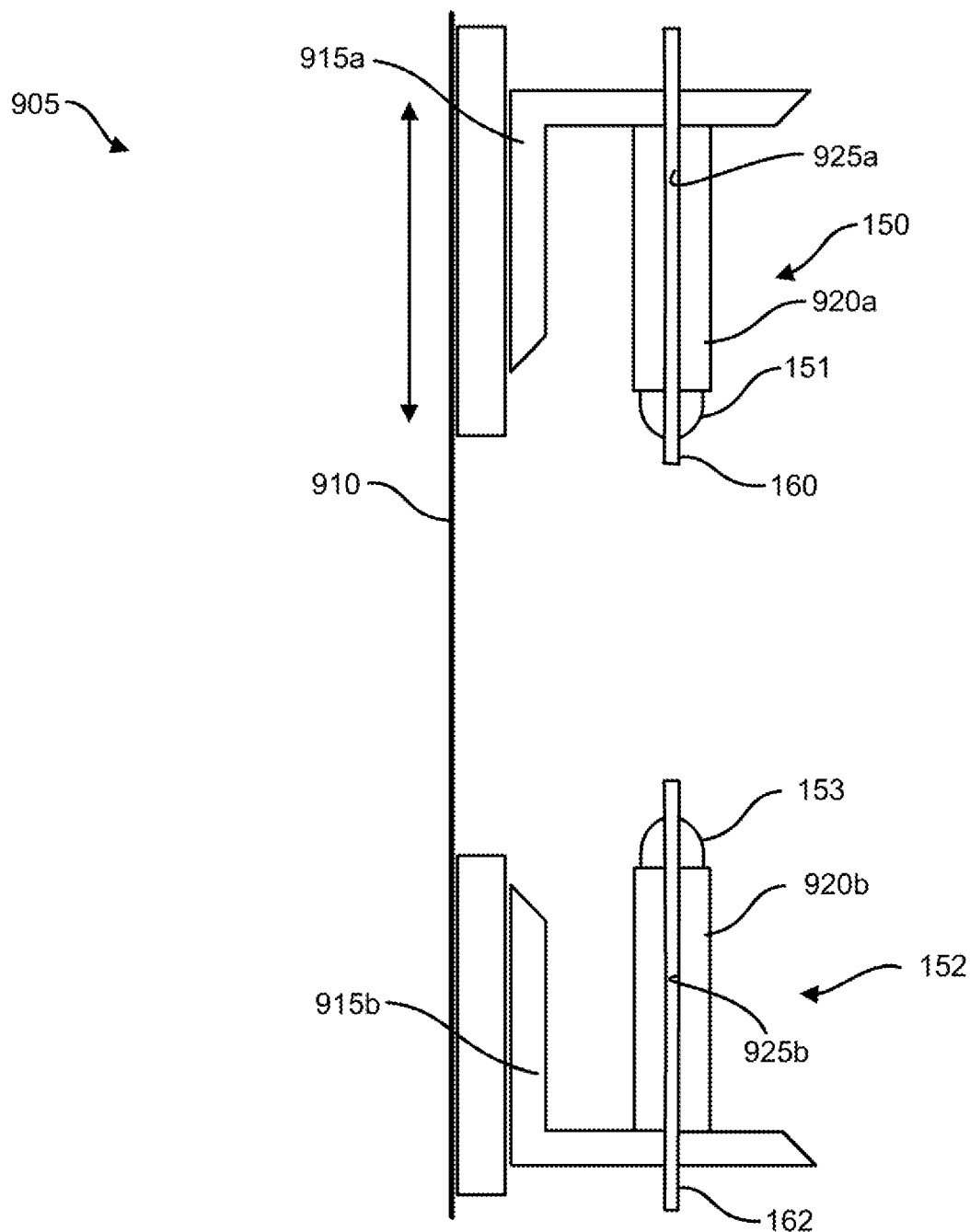
FIGS. 9A-9D illustrate an implementation of an automated column changer having a moveable stage.

FIG. 9A illustrates an implementation of an automated column changer 905 having a stage 910 with brackets 915*a*, 915*b* retracted into a load position. The stage 910 can be motorized or mechanically actuated. In some implementations, the upper bracket 915*a* can be moveable in an axial direction (e.g. up and down) whereas the lower bracket 915*b* can be fixed. The brackets 915*a*, 915*b* can be fixed to their respective coupler 150, 152. As mentioned above, the proximal fluidic coupler 150 can have a ferrule 151 sized to be inserted through the inlet opening 110 and positioned within the inlet chamber 120 and the distal fluidic coupler 152 can have a ferrule 153 sized to be inserted through the outlet opening 115 and positioned within an outlet chamber 140. The ferrules 151, 153 can be coupled to their respective tubular guide 920*a, b*. The tubular guide 920*a* can be formed of a relatively rigid material, such as stainless steel, and have a hole 925*a* extending through from a proximal end to a distal end configured to align with a corresponding hole in the ferrule 151. Tubing 160 can extend through the ferrule 151 and the guide 920*a* such that a proximal end of the tubing 160 connects to the HPLC pumping system and a distal end of the tubing 160 is available for fluidly communicating with the inlet chamber 120. The tubular guide 920*b* can also be formed of a relatively rigid material, such as stainless steel. The guide 920*b* can include a hole 925*b* extending through it from a proximal end to a distal end. The hole 925*b* can align with a corresponding hole in the ferrule 153. Tubing 162 can extend through the ferrule 153 and the guide 920*b* such that a proximal end of the tubing 162 is available for fluidly communicating with the outlet chamber 140 and the distal end connects to the detector system (e.g. Mass Spec). The ferrules 151, 153 can be permanently attached to their respective guides 920*a, b*.

Figure 9B:
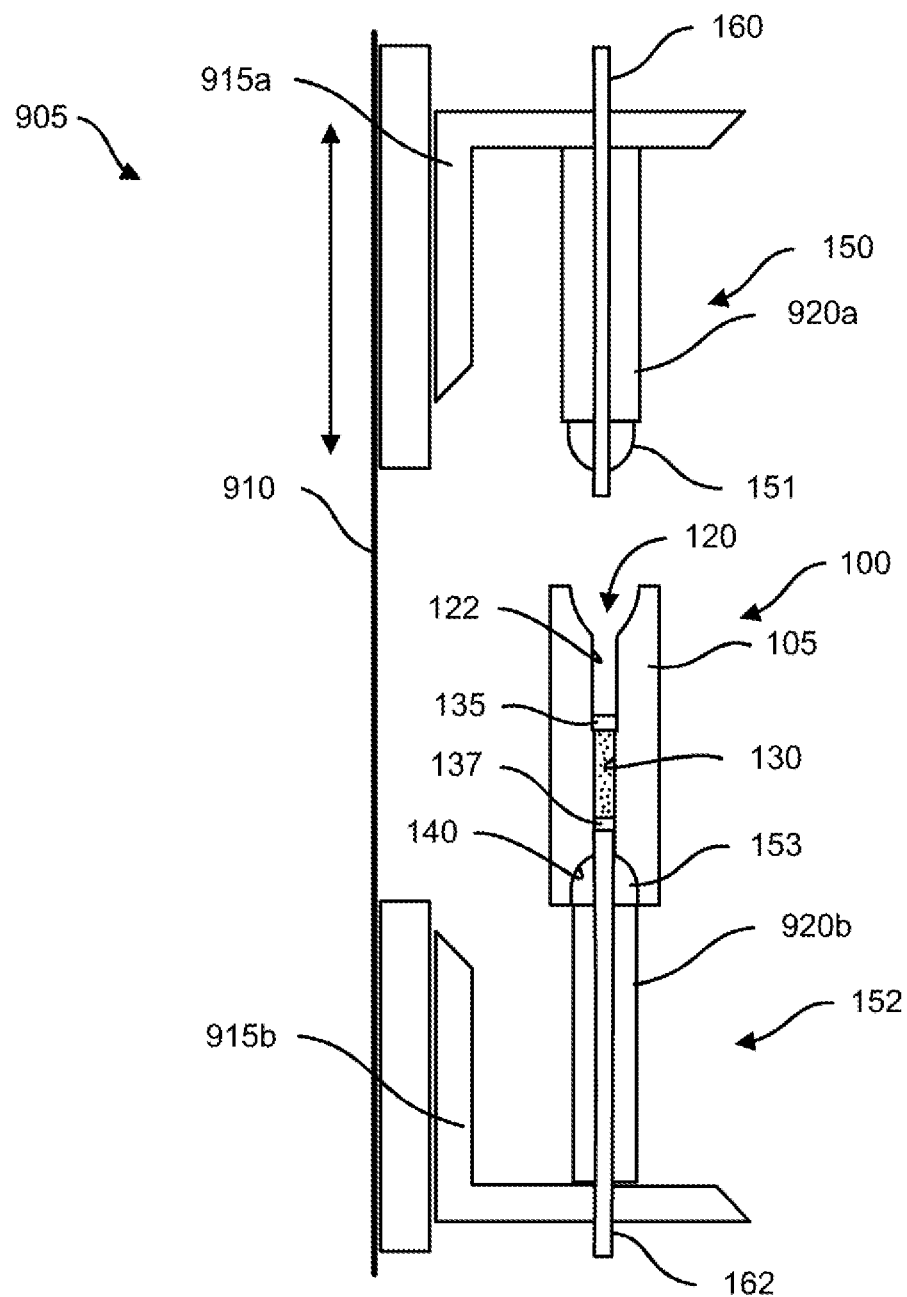

FIG. 9B illustrates the automated column changer 905 with a column 100 inserted between the brackets 915*a*, 915*b* retracted in a load position and coupled to the exit end ferrule 153. The ferrule 153 is inserted within the outlet chamber 140 of the column such that the outer surface of the ferrule 153 is pressed against the inner surface of the outlet chamber 140 and the tubing 162 is pressed up against the outlet end frit 137. The column 100 can be inserted manually or by a robotic arm. In some implementations, the column 100 can incorporate a keyed feature to ensure that only the correct column can be inserted in the correct orientation. It should also be appreciated that an array of columns can be inserted as described elsewhere herein.

Figure 9C:
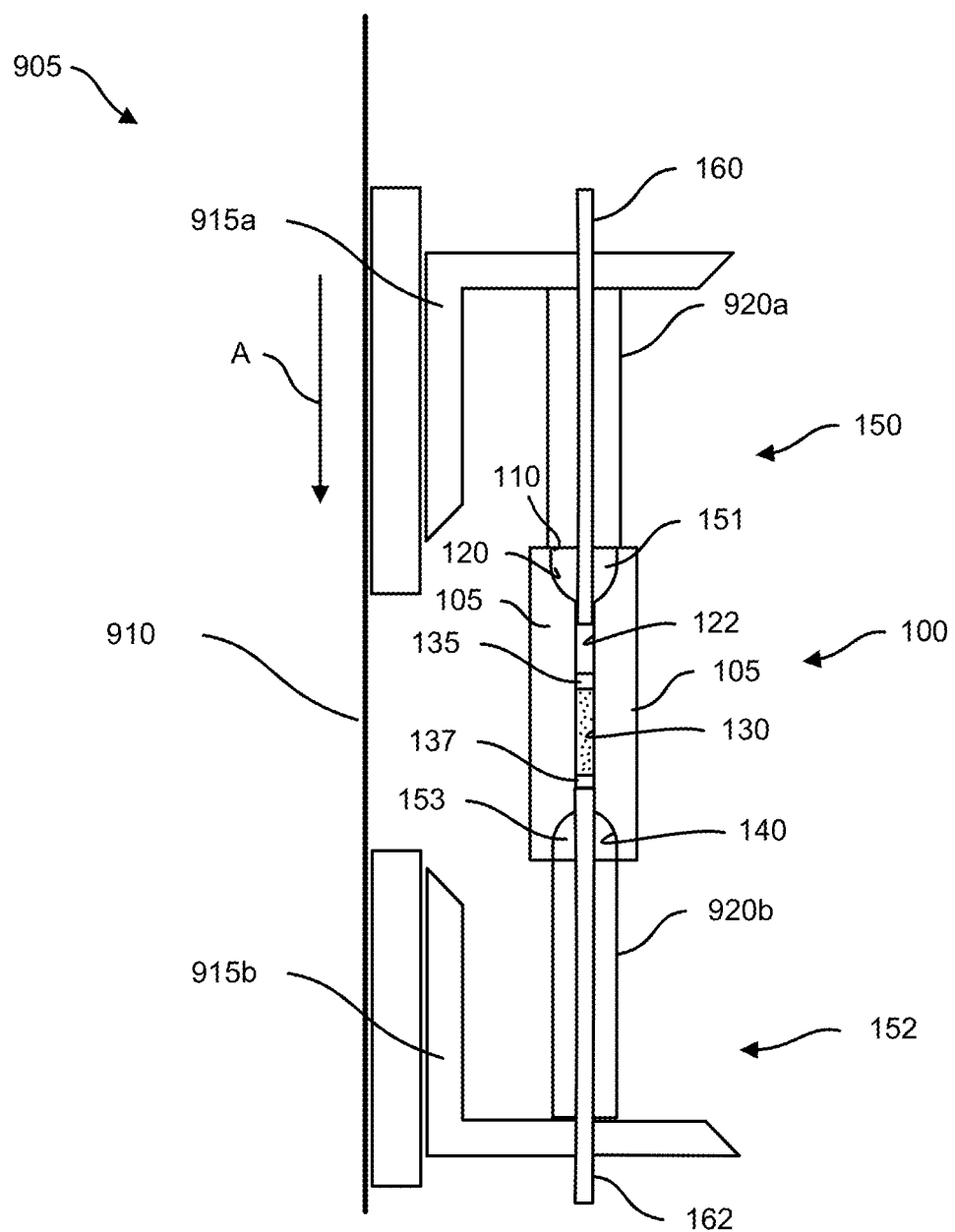

FIG. 9C illustrates the automated column changer 905 with the column 100 inserted between the brackets 915*a*, 915*b* in an engaged position such that both the exit end ferrule 153 and the entrance end ferrule 151 are engaged with the column 100. The bracket 915*a* on the stage 910 is moved towards the inlet end of the column 100 along arrow A such that ferrule 151 inserts through inlet opening 110 and presses against the inner surface of the inlet chamber 120. Tubing 160 is pressed up against the inlet end frit 135 and the fluidic circuit is established such that the column can be wetted.

Figure 9D:
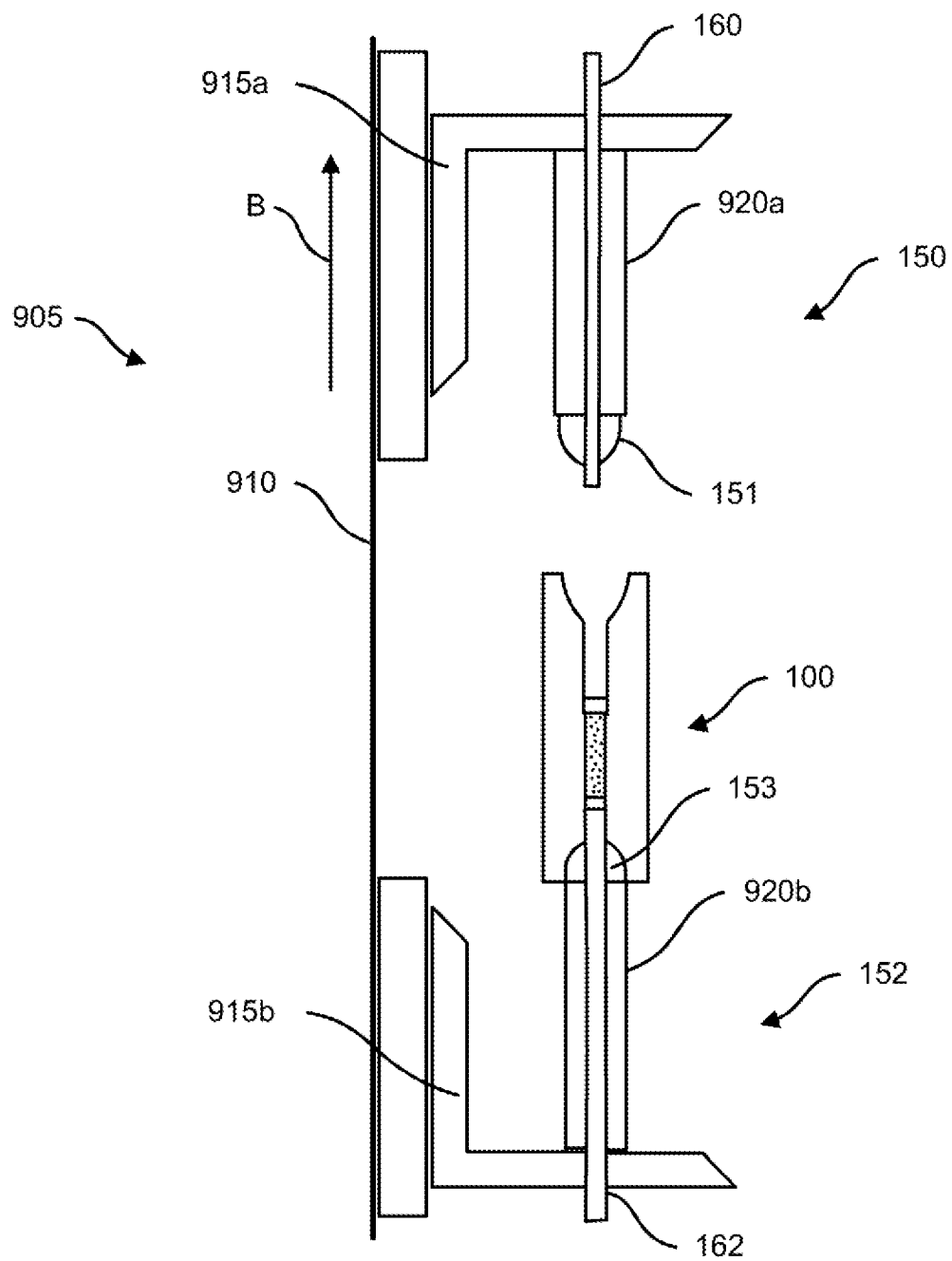

FIG. 9D illustrates the automated column changer 905 with the column 100 inserted between the brackets 915*a*, 915*b* in a load position once again. The exit end ferrule 153 can remain engaged with the outlet chamber 140 whereas the entrance end ferrule 151 can be withdrawn along arrow B such that ferrule 151 is removed from the inlet chamber 120 and away from the inlet opening 110. This reveals the inlet opening 110 such that specimen can be added directly into the specimen introduction area 122. The specimen and standards can be added via a single-use disposable pipette tip. It should be appreciated that this can be done manually by the user or via an automated robotic arm. The specimen analyzed by the columns described herein can vary, including biological (e.g. whole blood, plasma, serum, urine, cerebrospinal fluid (CSF), tissue extracts, etc.), environmental, and chemical. Once the samples and standards are added to the specimen introduction area 122, the fluidic circuit can be re-established by again moving the bracket 915*a* into the engaged position. The HPLC separation can be performed and analytes and standards detected by the sensor(s). After the separation, the proximal ferrule 151 can be once again withdrawn into the load position and the used column 100 removed and discarded. The stage 910 can remain in the load position ready for insertion of the next column.

The amount of compression force applied by the couplers 150, 152 can create a seal and prevent leakage during use of the column. The ferrules 151, 153 of the couplers 150, 152 can aid in creating this seal. For example, the material of the ferrules 151, 153 relative to the material of the column body 105 as well as the tubing 160, 162 extending through the ferrules 151, 153 can cause the chambers 120, 140 of the column body 105 to deform slightly upon application of compression force by the couplers 150, 152 when the ferrules 151, 153 are inserted within them. Additionally, the ferrules 151, 153 can also undergo a slight deformation upon application of pressure depending on the amount of pressure applied and the material of the ferrules 151, 153. Deformation of the ferrules, tubing and/or the chambers can ensure leak-free sealing throughout the entire assembly.

The material of the ferrules 151, 153 can vary depending on whether the system is to be a lower pressure system or a higher pressure system For example, for lower pressure applications the ferrules 151, 153 can be formed of polymeric material that deform at generally lower pressures. Ferrules 151, 153 used in high-pressure applications, such as HPLC or UHPLC, can be formed of a metal, such as stainless steel. Stainless steel typically needs much greater pressure to deform and can withstand much higher pressures without leaking. In some implementations, the tubing 160, 162 and ferrules 151, 153 can be formed of a metal material, such as stainless steel, and the column body 105 can be formed of a polymeric material such that the harder stainless steel can easily deform the polymeric column body 105 and create a leak-proof fitting at pressures for HPLC separations. It should be appreciated that the couplers 150, 152 can be used repeatedly and can be part of the system, whereas the column 100 is single-use and disposable. The column body 105 can be manufactured from a bio-inert polymeric material, such as polyetheretherketone (PEEK), polypropylene, polystyrene, or similar polymers.

As mentioned above, the proximal ferrule 151 and distal ferrule 153 can receive tubing 160, 162, respectively. Tubing 160 is configured to communicate with the pumping system and tubing 162 is configured to communicate with the detector. The tubing 160, 162 can extend entirely through the thickness of its respective ferrule 151, 153 such that it can complete the fluidic circuit. The tubing 160 can extend through the ferrule 151 such that upon mating the ferrule 151 with the inlet chamber 120 the distal ends of the tubing 160 extend into the specimen introduction area 122. Similarly, the tubing 162 can extend through the ferrule 153 such that upon mating the ferrule 153 with the outlet chamber 140, the distal ends of the tubing 162 extend into the analyte exit area 124. The tubing 160 can communicate with the solvent assembly including a wash solvent and elution solvent such that the distal ends of the tubing 160 deliver wash solvent and elution solvent into the specimen introduction area 122 through a lumen 161 (see FIG. 3) extending through the tubing 160. The solvents can flow into this area 122 where the solvents mix with any internal standards and specimen in the specimen introduction area 122 before flowing through the proximal frit 135 into the solid phase chamber 130 over the immobilized solid phase towards the outlet chamber 140.

Conventional columns incorporate various mechanical fittings and structural components (e.g. nut, annular collar, inlet cap, etc.) to prevent the exit end frit from becoming dislodged and the solid phase from being flushed from the column down the fluidic path towards the detector. The columns 100 described herein need no additional coupling elements detachably secured to either end as is typical with conventional columns. The mating surfaces can be robust enough to provide a leak-free fluidic connection even at the high operating pressures. It should be appreciated that the column 100 although illustrated with female connections configured to receive male fittings may be reversed such that the fittings on the column are male and the fluidic fittings are female.

The fluidic couplers 150, 152 can reversibly mate with the column 100 to connect it to the HPLC system. The columns 100 described herein are designed to be removed and replaced with every new specimen analyzed. Thus, the coupling mechanism for engaging the columns with the HPLC system is simpler and less onerous. As described above, the mating between the fluidic couplers 150, 152 and the column 100 requires no special tooling or conventional threading. The fluidic couplers 150, 152 can mate with the inlet and outlets chambers 120, 140 of the column 100 by any of a variety of non-threaded sealed couplings, including interference fit, O-ring, mated angle, snap fit, press fit, transition fit, interference fit, or a combination thereof. The clearance between them can be such that they are press fit together. The inlet chamber 120 can taper distally and the outlet chamber 140 can flare distally. As such, the amount of interference increases the further the couplers are linearly inserted into their respective chambers. The couplers 150, 152 are easily inserted through their respective inlet and outlet openings and the clearance between them with their respective chambers decreases the further the couplers 150, 152 advance into their respective chambers until a sealing engagement is achieved. The mating requires no rotation of threaded couplers that often can require tools, such as a wrench, that must be tightened by rotation.

As described above, a stage 910 can be incorporated with the HPLC system that provides sealing engagement of the couplers 150, 152 with their respective chambers 120, 140. The fluidic couplers 150, 152 can be moved by the stage 910 between a first position (e.g. a load position) and a second position (e.g. an engaged position) to attach the column 100 to the HPLC system. The first position of the stage 910 allows for the column 100 to be inserted into the HPLC system between the two couplers 150, 152 positioned away from one another (see FIG. 4 or 9A-9B, and 9D). Once the column 100 is positioned relative to the HPLC system, the fluidic couplers 150, 152 can be moved by the stage 910 from the first position to the second position such that they move toward one another to mate with the inlet chamber 120 and the outlet chamber 140 and complete the fluidic circuit (see FIG. 5). The flow of fluid can then proceed through the column 100 towards the outlet chamber 140. In some implementations, only one of the fluidic couplers 150, 152 is moved between the load position and the engaged position while the other coupler remains fixed. The sealing engagement requires no additional coupling feature aside from an interference fit between the ferrules and the column body 105. For example, the sealing engagement between the column and the couplers 150, 152 needs no threaded nut or other mechanical feature that requires special tools and manual attachment of the column to the system. The sealing engagement also requires no torque or twisting movements in that the movement of the couplers 150, 152 toward or away from one another are along an axis and provide a compression force along the axis that is configured to withstand pressures of an HPLC. The stage can provide reproducible and reversible coupling between the system and the column in less time than conventional systems and with very little user input aside from actuating a button or otherwise turning on the system. Additionally, because the column body 105 is formed of a monolithic piece of material there are fewer opportunities for leakage between the system and the column.

As mentioned above, the inlet opening 110 opens into the inlet chamber 120 that tapers down to the smaller-dimensioned specimen introduction area 122 sized to receive small, metered volumes of liquid specimen to be fractionated. The volume of liquid specimen added to the specimen introduction area 122 can vary. In some implementations, the volume is between 3 uL to 10 uL. For analytes present at higher concentrations (e.g. antibiotics in blood), the specimen volume may be limited to less than 3 uL. Smaller specimen volumes may be limited by accuracy of specimen transfer. For example, a specimen volume as small as 0.1 uL can be transferred by a pipette with reasonable accuracy. In other implementations, a larger cartridge can have specimen introduction area configured to hold a liquid volume up to about 20 uL. Larger specimen volumes may be useful for specimen having very low analyte concentration. Thus, the volume size of the liquid specimen can be anywhere between 0.1 uL up to about 20 uL or more.

The specimen introduction area 122 can receive the metered volume of liquid specimen between the distal end of the proximal fluidic coupler 150 and the proximal porous frit 135. A conventional specimen introduction apparatus, such as a rotary valve, can be used to introduce specimens to the columns 100 described herein. In some implementations, the column 100 can be used with an HPLC system that includes no conventional specimen introduction apparatus, rotary valve or other injection valve such that the liquid specimen to be analyzed is directly introduced through the inlet opening 110 into the specimen introduction area 122 upstream from the entrance frit 135 of the solid phase 125. The fluidic coupler 150 can be moved out from the inlet chamber 120 into an insertion position such that the liquid specimen can be introduced directly into the column 100 with disposable pipette tip 405 or other mechanism (see FIGS. 3-4). Once the specimen is introduced into the specimen introduction area 122, the fluidic coupler 150 can be moved back into the inlet chamber 120 into the sealed position creating a fluidic connection between the HPLC system and the column 100 (see FIG. 5). In some implementations, the column 100 is wetted prior to introduction of sample. The column 100 is conditioned with wash and elution solvent prior to the introduction of the sample. After conditioning, the flow can be cut or diverted to waste, the proximal fluidic coupler 150 withdrawn from the chamber 120 such that the sample and internal standards can be loaded into the sample introduction area 122. Once the column 100 is loaded with sample in the sample introduction area 122, the proximal coupler 150 can be reinserted to the chamber 120 until a seal is formed to reestablish the fluidic circuit.

HPLC analysis includes one or more internal standards, which are chemical species present in known amounts that yield known results when an elution solution containing the standard is passed through a detector, such as a mass spectrometer. The user or system can introduce the one or more internal standards via the inlet opening 110 at the time of adding specimen to be analyzed. The series of different internal standards at different concentrations can be added to the test sample or the column as described in U.S. Pat. No. 9,494,497, which is incorporated by reference herein its entirety.

When a plurality of specimens need to be analyzed for different analytes, the optimum fractionation for an individual specimen may be performed through the use of different types of wash and elution solvents and/or HPLC columns containing different solid phases 125. In conventional HPLC, switching wash and elution solvents can be accomplished through the use of a pumping system, such as a quaternary pump, that facilitates the rapid changeover from one solvent system to another. However, switching HPLC columns is more challenging and typically requires manual intervention by a skilled technician. With the single-use, disposable columns 100 described herein a plurality of different HPLC columns 100 can be available, such as stored within a laboratory inventory, such as a hospital laboratory. The appropriate and optimized column 100 can be used for individual specimens or analytes. For example, aliquots of a single specimen can be analyzed multiple times for different analytes using disposable HPLC columns with different solid phases.

Figure 6:
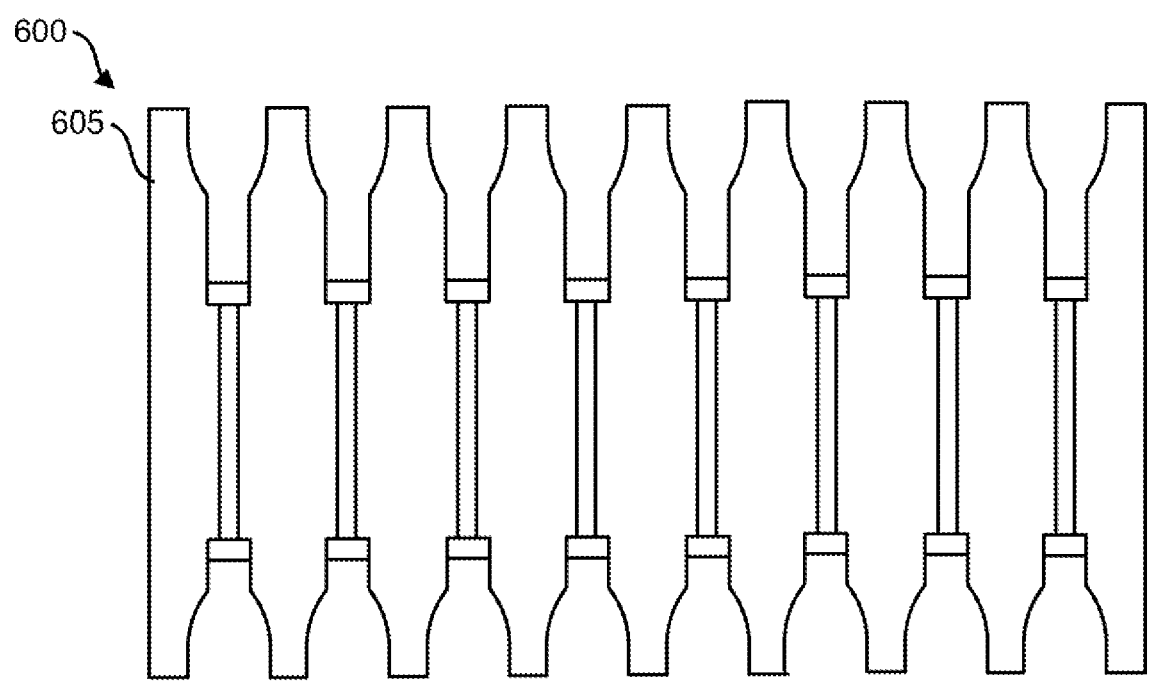
FIG. 6 is a side view of an array of columns designed for single-use.

A plurality of single-use columns 100 can be installed within the HPLC system. For example, multiple single-use columns 100 can be loaded into an HPLC system, each column 100 configured to test different analytes. This allows for biological samples from a single patient to be tested serially in an automated fashion. In some implementations, a plurality of single-use, disposable columns 100 can be manufactured as an array 600. In use, the array 600 can allow for automation and rapid switching between columns 100 for the analysis of a plurality of specimen. FIG. 6 illustrates a linear array of columns. Although FIG. 6 illustrates the array 600 as having a certain number of columns 100, the array 600 can include any number of columns in series, including 8, 12, 16, 20, 24, or other number. Any of a variety of configurations is considered herein. The columns 100 of the array 600 can be arranged linearly, circularly, a 2-dimensional array body 605. The monolithic body 605 can define a plurality of fractionation columns 100, generally up to about 24. In some implementations, the array 600 can include 96 columns 100 manufactured in a 12×8 array for analysis of 96 specimens contained within an SBS-standard 96-well microtiter plate. The individual fractions can be collected within an array of collection wells, such as a 96-well or 384-well microtiter plate, as described in more detail below.

The columns 100 described herein can allow for verification that a particular solvent assembly is compatible with the column 100 selected to be used. For example, one or more readable codes can be positioned on a surface of the monolithic column body 105 or the array body 605. The codes can be written codes (e.g. numerical or letter codes), machine readable codes, quick response (QR) codes, bar codes, electronic codes (e.g., RFID codes), electromagnetic codes, color codes, physical compatibility (e.g. lock and key fitting that allows only compatible items to connect), or a combination thereof. The codes can be used to identify a solvent assembly as compatible with a single-use column 100 (or array of columns). The user or system can read the code on the column 100 (or array of columns) prior to introduction of the sample, after introduction of the sample, before introduction of the solvent, or any combination thereof. The system can alert the user to an incompatibility between the column 100 (or array of columns) and solvent with a visual alarm, an audio alarm, or both. The system can also prevent an analysis from progressing when incompatible solvents are detected in the form of an incompatible solvent assembly.

The columns 100 described herein can also incorporate fittings that are keyed. For example, a region of the column 100 can include a key to prevent improper insertion of the column 100 into the system or to prevent accepting certain solvent assemblies, for example, as described in U.S. Publication No. 2015/0377842, filed Jun. 25, 2014, which is incorporated by reference herein in its entirety. The one or more keys can correspond to one or more features on the column 100, such as at the inlet opening, the inlet chamber, or the outlet opening or outlet chamber, so that only certain columns having particular solid phase 125 can be used with certain solvent assemblies to avoid errors in solvent use. The keyed fittings can have a unique shape, such as a tapered end, similar to Luer-type fittings, or curved or angled shapes, asymmetrical shapes, notched portions, such that the fluidic couplers 150, 152 is prevented from fitting with a column 100 having a particular solid phase 125. The shapes of the keyed fittings can also improve correct assembly of the system in that it would prevent incorrect connections or connections in the wrong orientation. In some implementations, a notch or other surface feature can prevent improper insertion of the column 100 into the system. It should be appreciated that similar keyed features can be incorporated on the array 600 of columns 100.

The columns described herein can be used to fractionate unprepared, whole biological samples including whole blood as well as other high protein containing samples, such as serum, plasma, urine, or homogenized tissue samples. It should be appreciated, however, that other biological samples can be run on the columns as well and they should not be limited to high protein-containing samples. In some example embodiments, a single-use column 100 can be supplied with a solvent assembly in an assay kit, such as in a sealed pouch. The kit can be designed for manual application of a biological sample into the specimen introduction area 122, such as via manual pipetting or automated systems. In some implementations, the kit can be designed for use with a specific instrument that can control the addition of a biological sample and the solvents to the specimen introduction area 122. The instrument can also control atomization and ionization of the sample, and eventual analysis using a mass spectrometer or other detector system.

Figure 7:
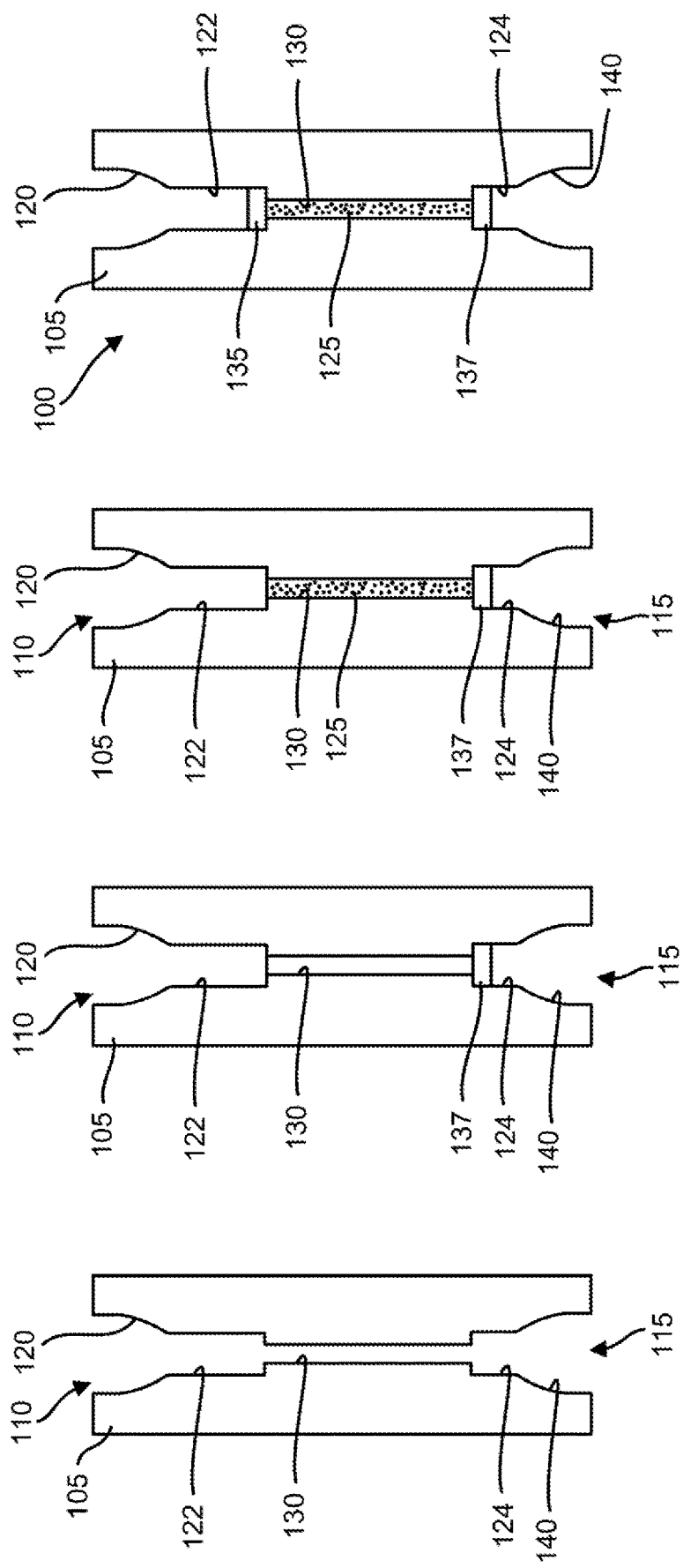
FIGS. 7A-7D illustrate an implementation of a method of manufacture of the single-use, disposable chromatography column of FIG. 1.

The method by which the column 100 is manufactured allows for high-volume, low-cost production, which can facilitate economical single-use workflow compared to conventional HPLC columns. As mentioned above, the column body 105 can be machined, cast, molded, or 3D printed such that a monolithic, unitary piece of material defines the body 105 including the inlet opening 110, inlet chamber 120, specimen introduction area 122, solid phase chamber 130, analyte exit area 124, outlet chamber 140, and outlet opening 115 (see FIG. 7A). The column body 105 can be manufactured from metal, resin, polymer or a combination thereof. The exit end frit 137 can be press-fit within the column body 105 distal to the solid phase chamber 130 within the proximal end of the analyte exit area 124 (see FIG. 7B). In some implementations, the column body 105 is molded with at least the exit end frit 137 already embedded in place. The column can be packed with a metered amount of solid phase 125 by addition of the material from the entrance end of the column body 105 through the inlet opening 110 and the inlet chamber 120 (see FIG. 7C). The solid phase 125 can be added as a dry powder or as liquid slurry at ambient or elevated pressure. Once the column chamber 130 has been packed with solid phase 125, the proximal end porous frit 135 is press-fit at the entrance end of the column body 105 such that it is immediately adjacent to a proximal end of the column chamber 130 and at a distal end region of the specimen introduction area 122 (see FIG. 7D). The unitary body greatly simplifies the manufacture of the column 100. A single, monolithic part requires minimal manipulation. In some instances, the distal porous fit 137 can be embedded during molding of the monolithic part. The simplicity of manufacturing the unitary body reduces the cost and thereby lowers the per-sample analysis cost to an economically acceptable level allowing for the entire column to be disposable, single-use columns. Additionally, the monolithic, unitary body mitigates risk of leaks that would otherwise occur in a conventional column having joints and unions.

Figure 8:
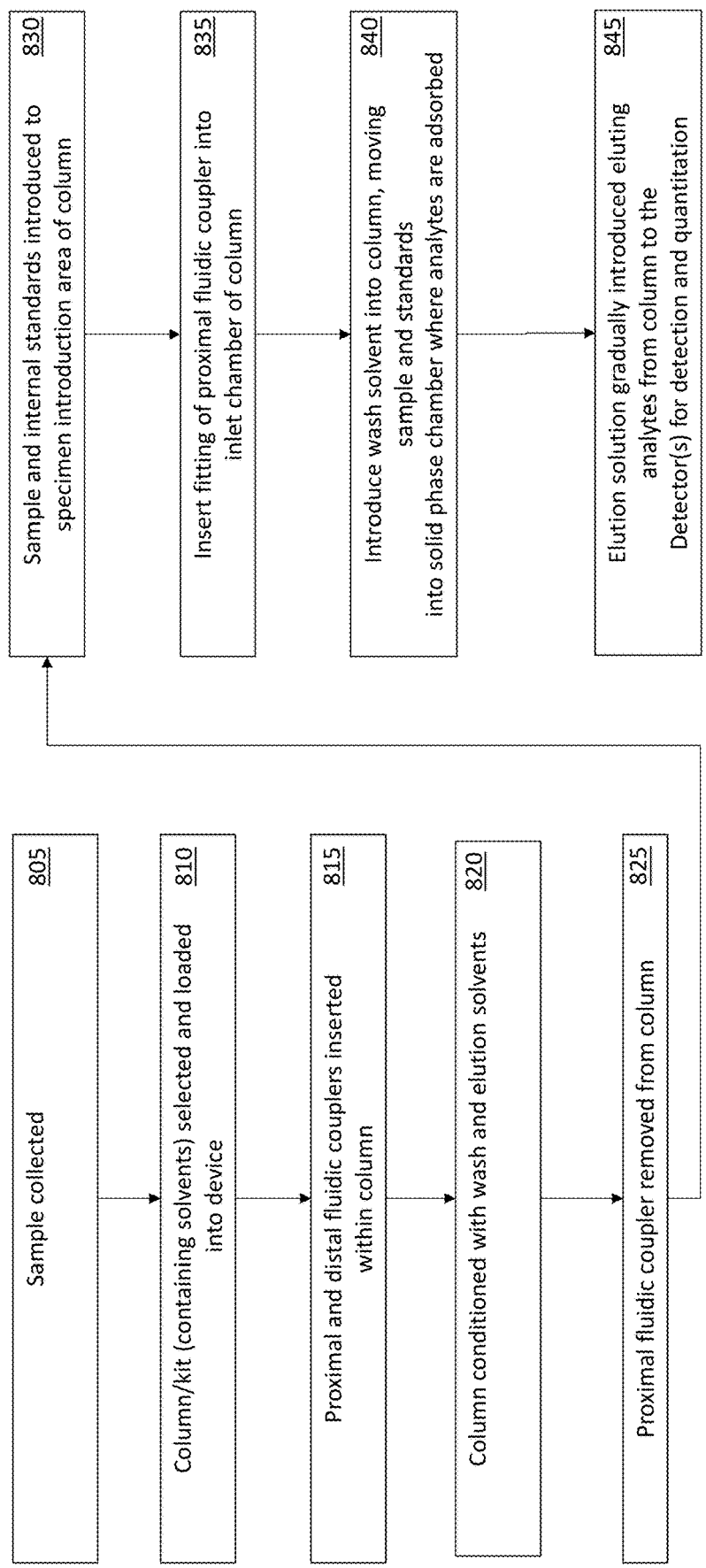
FIG. 8 illustrates an implementation of a method of use of the single-use, disposable chromatography column of FIG. 1.

FIG. 8 illustrates an implementation of a method of use of the columns described herein. A sample, such as a biological sample, is collected (box 805). The biological sample can be blood, urine, or a homogenized tissue sample. The user can select the column 100 to analyze the sample and load into the device (box 810). In some implementations, the column 100 and the solvents are part of a kit. The proximal and distal fluidic couplers are inserted within the column 100 (box 815) and the column 100 is conditioned with wash and elution solvents (box 820). In some implementations, the column 100 can be connected to the system by inserting a fitting of the proximal fluidic coupler 150 into the inlet chamber 120 of the column 100. The column 100 can be flushed, such as using the pump of the HPLC system, with wash and/or elution fluid to ensure that the solid phase 125 within the solid phase chamber 130 is wetted and prepared to enact the fraction of the specimen. The fittings can be inserted using an automated mechanical stage as described elsewhere herein. Once the solid phase 125 has been wetted and prepared, the pump can be halted or the fluid diverted away from the column 100 (e.g. to the waste) and the proximal fluidic coupler 150 removed from the column 100 (box 825). Upon removal of the proximal fluidic coupler 150, a volume of wash and/or elution solvent may remain in the specimen introduction area 122. The volume remaining can be removed by vacuum aspiration or wicking with an adsorbent material, such as filter paper. In some implementations, a short pulse of compressed air is applied to the specimen introduction area 122 to blow any residual volume of fluid remaining prior to introduction of a sample to the specimen introduction area 122. A small, metered volume of the sample to be analyzed and one or more internal standards can be introduced into the specimen introduction area 122 of the column 100, for example, manually with a pipette or by an automated dispensing system (box 830). The sample can be a high protein sample, such as whole blood, serum, or plasma. In some implementations, the biological sample has undergone no prior processing aside from being taken from the patient (e.g. by blood draw). The sample can be transferred from a specimen reservoir (e.g. a tube, vial, microtiter plate) and transferred to the specimen introduction area 122 above the entrance frit 135 of the column by a pipette tip 405 or similar technique. The ferrule 151 of the proximal fluidic coupler 150 is inserted into the inlet chamber 120 of the column 100 to seal the system once again completing a fluidic circuit between the pumping system, the specimen, the column, and the detector so that fluid flows toward the chromatography portion of the column (box 835). Wash solvent can be introduced into the column, moving sample and standards into the solid phase chamber where analytes of interest are adsorbed (box 840). Elution solution can be gradually introduced eluting analytes from the column to the detector(s) for detection and quantitation (box 845).

Over time, the column 100 having a mixture of wash solvent and elution solvent causes the analyte of interest to reach the detector, such as a mass spectrometer.

The elution solution with the fractionated sample constituents and standards can be passed to the mass spectrometric analysis portion of the system to obtain reference data, as well as data regarding the analytes of interest, including the presence or absence of such analytes. Once the mass spectrometric analysis portion of the system has completed data collection, the data from the mass spectrometric analysis portion of the system can be reported to the user, clinician, or to another system for data analysis. For example, the data can be forwarded to a clinician or a user, such as a caregiver, electronically, through a written report, or both electronically and in a written report. Also, further manipulation of the data may be needed to provide a clinician or other caregiver with information that can be used to treat a patient, and another system may perform such data manipulation if the clinician cannot, for example due to time or lack of specific expertise. It should be appreciated that each step of this method can be performed within a hospital setting such that the specimen need not be shipped to a location outside the hospital. This can be particularly useful for time-sensitive applications in the hospital in which turn-around time is of the essence.

Without in any way effecting the scope of the claims, a technical effect of the systems, methods, apparatus, and kits, described herein includes time and labor savings, elimination of potential errors, streamlined logistics and inventory management, improved safety, elimination of solvent quality control and quality assurance, and/or elimination of solvent waste.

The systems, methods, apparatus, and kits, described herein can be used in many situations. For example, the systems, methods, apparatus, and kits described herein can be used to diagnose a patient in an emergency room. The patient may be suspected to have, or exhibit, any of the following conditions: acidosis, intentional overdose, uncontrolled seizures or convulsions, being comatose or unresponsiveness, and cardiovascular arrhythmia and/or hypotension, usually seen in geriatric patients. In some such instances, the analysis system does not need to be accurate in terms of the amount of analyte present in a sample, rather only the detection of a toxic or overdose level of an analyte needs to be determined. The following are exemplary situations in which systems, methods, apparatus, and kits, described herein can find use.

Metabolic Acidosis: When a patient presents with acidosis (i.e.: low blood pH) there can be several possible causes. For example, ingestion of a toxic alcohol, such as methanol or ethylene glycol, leads to acidosis. Other causes not related to a toxic exposure, such as starvation, metabolic disorders, diabetes, asthma, strenuous exercise, and the like, can also lead to acidosis. There are few tools at the disposal of the physician (e.g., pH measurements, osmol gap measurement) to make a diagnosis as to the cause of acidosis or to direct the course of treatment.

Although toxic alcohol induced acidosis presents similarly to metabolic acidosis, these conditions have very different treatments. Toxic alcohol exposure typically involves treatment with an alcohol dehydrogenase inhibitor, such as Fomepizole at low concentrations (e.g., below 50 mg/mL) and hemodialysis at higher concentration (e.g., above 50 mg/mL), while metabolic acidosis requires treating the underlying condition. Toxic alcohol poisoning can cause permanent damage (e.g., optic nerve and kidney toxicity) and potentially be fatal if not treated promptly. In contrast, patients with metabolic acidosis and suspected exposure are often dialyzed as precautionary measure. Trained staff to assay toxic alcohols and the specialized instrumentation to obtain the results (e.g., gas chromatography (GC or GC-MS) are not widely available at all hospitals.

The ideal assay panel would measure the concentration of toxic alcohols and their metabolites along with several markers of metabolic activity in the patient. Lactate and pyruvate levels are key markers of the energy state in a healthy cell. If there is a metabolic disorder, the lactate/pyruvate levels become altered, so these levels can provide an important diagnostic clue to a physician or other caregiver. Specific assays of interest in the toxic alcohol panel can include methanol, isopropanol, ethylene glycol and their metabolites formic acid, acetone, and glycolic acid, respectively. Lactate and pyruvate are of interest to help in diagnosing causes of acidosis or ketosis that may be unrelated to exposure to toxic alcohols. The columns provided herein can be incorporated into kits to test a patient's blood or urine for these alcohols, as well as possibly indicating the levels, or relative levels, of lactate and pyruvate.

Intentional overdose (OD) panel: The archetypal OD patient is a 16-25 year old female who intentionally overdoses on prescription medication. Often the drug, typically an antidepressant or anxiety medication, that was ingested by the patient is known to the emergency room physician. Antidepressants, such as Bupropion, and selective serotonin reuptake inhibitors (SSRIs), such as Citalopram, in particular, need to be monitored very closely due to possibility of late onset seizures, sometimes days after the initial exposure. Furthermore, the current standard of care is to test each and every intentional overdose patient for acetaminophen and salicylic acid given the ability of these common drugs to cause liver damage and that can result in complications for an OD patient. The columns provided herein can be incorporated into kits that include solvents where the column includes solid phase configured to fractionate samples to detect toxic levels of acetaminophen, salicylic acid, as well as anti-depressants. It should be appreciated that running an intentional overdose panel can include one or more kits.

Uncontrolled convulsions or seizures: When a patient is admitted to the ER with uncontrolled seizures or convulsions there may be multiple causes including an underlying seizure disorder like epilepsy or a completely unrelated, non-physiological cause, such as an overdose of a drug that cause convulsions (e.g. cocaine or methamphetamines). The seizure panel can test the patient for commonly prescribed anti-convulsant drugs like Lamotrigine, carbamazepine and Levetiracetam to determine if the patient has a sub-therapeutic systemic dose due to missed medications or a change in the presentation of the disease. The panel can also monitor compounds known to cause convulsions or seizures, such as amphetamines, cocaine, buproprion, citalopram, and possibly others. This panel can also include two assay kits—the first kit designed to prepare samples for detecting medications to treat seizure disorders and the second kit designed to prepare samples for detecting likely toxin induced seizure agents.

While the panel need not be capable of looking at every drug known to cause or prevent seizures, a set of assay kits that cover the most likely 4-5 agents can help physicians to diagnose a large percentage of patients. The treatment for a patient who has missed several doses of his seizure medication is very different from one who has overdosed on cocaine, so knowing what has been ingested by a patient is crucial.

Coma Panel: Another common ER patient is an unresponsive or comatose patient. In this case the physician is interested in determining whether or not the patient has ingested a large amount of sedatives, including prescription and illegal opiates, benzodiazepines, and heroin. The kit or set of kits need not be capable of identifying every possible drug or sedative, but can focus on the most commonly observed agents. Even a negative result for the agents being assayed can be useful, as it will help the physician rule out the most obvious and common causes and allow him or her to shift attention to other possible causes for the condition of the patient.

Cardiovascular Panel: The archetypal patient is an elderly person with arrhythmia, bradycardia, and/or hypotension. Many of these patients are on multiple medications and it is common that dosing of one or more of the drugs is incorrect, either due to lack of patient compliance or a change in the underlying disease. Provided herein is an assay kit designed to allow the systems described herein to detect beta-blockers, calcium channel inhibitors, and anti-arrhythmia drugs, specifically propafenone, clonidine, guanfacine, and the like. However, over time, the list of particular drugs can change as pharmaceutical markets evolve. A rapid blood test can help the physician diagnose the potential issue with the patient, which is often due to an accidental overdose or missed doses (i.e. an underdose) of an already prescribed medication.

In some implementations, the disposable columns 100 can be incorporated in series along the fluid path such that the specimen is introduced into the inlet chamber 120 of a first column 100 and exits into an inlet chamber 120 of a second column 100. The columns can be conventional HPLC columns or can be disposable, single-use columns as described herein. The columns in series can incorporate a valve system (not shown) in between the first and second columns to introduce different wash and elution fluids to each of the columns at different times. This method allows for the enrichment of a specimen for one or more analytes or classes of analytes prior to fractionation and analysis. The solid phase 125 contained in the first column 100 can dictate what types of analytes are retained or eluted and analytes of interest can be selectively diverted to the second column for further fractionation.

Serial column fractionation can be useful for any of a variety of applications. For example, serial fractionation can be used to enrich phospho-peptides in a complex mixture (e.g. cell lysates) through the use of a solid phase 125 that selectively retains phosphorylated peptides (e.g. titanium-dioxide or zirconium-dioxide) in the disposable first column and a conventional C18 HPLC column as the second column. The specimen can be loaded onto the first column and washed under conditions that retain peptides containing phosphate modifications while peptides that are not phosphorylated can be diverted to waste. The phospho-peptides can then be eluted from the first column and fractionated by the second column prior to analysis. The enrichment of phosphorylated peptides performed by the first column can greatly reduce the complexity of the fractionation in the second column and provides improved data quality.

In some implementations, a plurality of columns can be incorporated. A size-exclusion solid-phase material can used in a first single-use disposable HPLC column and a second column can be a conventional multi-use reversed-phase column. The specimen to be analyzed can be a mixture of a large molecule (e.g. a protein, DNA, RNA, or polymer) and one or more small molecule test compound. The method can detect whether or not one or more of the test compounds reversibly bind to the large molecule. The mixture can be loaded onto the first disposable column and washed with an appropriate solvent (e.g. saline). In size-exclusion chromatography, the large molecule(s) rapidly wash through the column while small molecules take much longer to elute. However, any small molecules that are bound to the large molecule(s) can be co-eluted with the large molecule. The large molecules are then trapped on the second (reversed-phased) column and a second fractionation can be performed where any small molecule binders are separated from the large molecules and detected by the downstream sensors.

The disposable columns described herein can be used in series with a second column that may be a second disposable column or a conventional column. The columns can be used to perform non-covalent binding assays. The non-covalent binding assays can be performed according to any of a number of different approaches including direct and indirect methods, such as surface plasmon resonance, interferometry, ligand displacement assays, and others. In some implementations, mass spectrometry can be used, for example, when running screening assays due to its capability of analyzing a wide range of test compounds. This can facilitate multiplexing, which can greatly lower the amount of reagent required for each analysis while also reducing assay time.

In some implementations, multi-dimensional chromatography can be used to assay protein-small molecule and protein-protein interactions. The assay can be performed through the coupling of size-exclusion chromatography (SEC) in a first dimension with reversed-phase chromatography (RPC) in a second dimension. The protein target and any bound small molecule test compounds can be resolved from non-binding small molecules using size-exclusion chromatography. The large molecules (i.e., protein targets and any binders) can elute quickly through the SEC column while unbound small molecules can take much longer to elute. The early eluting portion of the SEC column can then be diverted onto a RPC column and the binders can be separated from the proteins and identified and/or quantified by mass spectrometry.

It should be appreciated that the multi-dimension chromatography methods described herein can be configured for high-throughput systems, such as an Agilent RapidFire high-throughput mass spectroscopy instrument. The RapidFire system is capable of reversed phase samples fractionation at throughputs of six seconds per sample. The use of a RapidFire system in a multi-dimensional chromatography system where the first dimension is a size-exclusion column is impractical since complete elution from a size exclusion column may take several minutes. While the protein target and any binders typically elute in 1-2 column volumes (which can be accomplished in seconds) the unbound small molecules can take many minutes to elute and become the rate-limiting step of such a high-throughput analysis. The SEC column used in the first dimension of the non-covalent protein binding assay can be a single-use disposable column as described. The column can contain a size-exclusion solid-phase that separates molecules based on molecular weight. When the mixture of protein and test compounds are applied to the disposable SEC column, the protein and a bound test compound wash through the SEC column with a saline solution in under two seconds and are diverted to a C18 RapidFire cartridge where they are adsorbed and retained. The protein and test compound on the C18 column are then washed with water to remove the salt and eluted with an 80% acetonitrile solution to a mass spectrometer. The mass spectrometer is used to determine the molecular weight (and thereby the identity) of the small molecule test compound that bound to the protein. The entire analysis is completed in fewer than 12 seconds. The use of the disposable SEC column in the first dimension eliminates the problem of unbound small molecule test compounds taking minutes to elute from the SEC column. The SEC column is simply disposed of with the uneluted test compounds still inside and a new column is used to analyze the next set of small molecule test compounds. In this manner, a truly high-throughput and automated protocol for binding assays can be accomplished.

Small molecule drug discovery often involves the screening of many thousands or even millions of candidate chemical compounds of a chemical library to select for those with desirable functionality, such as binding to a ligand or affecting a chemical or enzymatic reaction. Successive iterations of chemistry are often performed on candidate chemicals to further improve desirable functionality or minimize undesirable effects. Due to the instability of many compounds, routine quality control checks of chemical libraries must be performed to ensure the integrity of the chemical collection. HPLC-UV-MS is a preferred technique in the purification of newly synthesized compounds and is typically performed serially. Where mass spectrometric analysis can be performed on a sample along the order of milliseconds, HPLC fractionation takes on the order of minutes even with the use of very high-performance HPLC systems (e.g. UHPLC). For a million compound chemical library, this is extremely slow. Additionally, screening large chemical libraries having compounds of very diverse chemical properties is rife with issues of carry-over. For example, chemicals that are very hydrophobic may not elute completely from a solid phase or from the apparatus itself (e.g., valves).

Described herein is a system that greatly improves the overall throughput of the HPLC-MS process through multiplexing of the rate-limiting HPLC fractionation step. Further, the system described herein decouples the rate-limiting fractionation from the MS analysis. Independent MS analysis, which is by far quicker than fractionation, can be performed off-line as an independent step. The system provides advantages for the purification of newly synthesized chemicals as well as the quality assurance of the structural and chemical integrity of chemical libraries.

Figure 10:
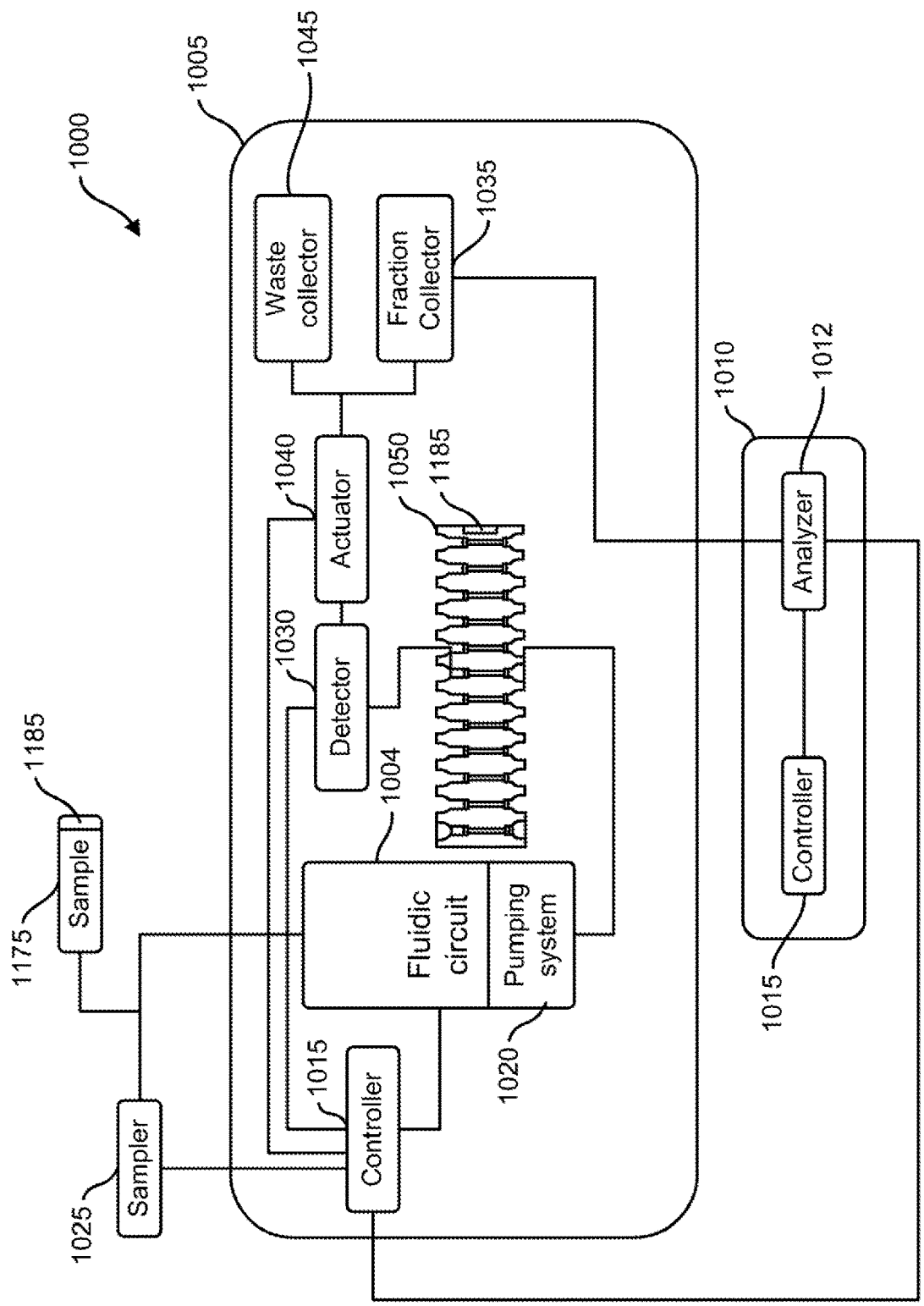
FIG. 10 is a block diagram of an implementation of a system for high-throughput fractionation and analysis.

FIG. 10 illustrates an implementation of a system 1000 that is configured for multiplexed, high-throughput analysis. The system 1000 can include a fractionation system 1005 and an analysis system 1010 including an analyzer 1012. The fractionation system 1005 can be an HPLC system configured to receive a multiplexed, single-use cartridge 1050 having an array of fractionation columns 1100 (see FIG. 12) as described elsewhere herein. The fractionation system 1005 can include a fluidic circuit 1004 having a pumping system 1020, configured to be in fluid communication with respective columns 1100 of the cartridge 1050. The output of the columns 1100 is arranged relative to a detector 1030 configured to direct fractions from the columns 1100 into a fraction collector 1035 or a waste collector 1045 by an actuator 1040 based on a detected level of analyte in a fraction. Each will be described in more detail below.

One or more controllers 1015 can control the fluidic circuit 1004, the detector 1030, the actuator 1040, and/or the analyzer 1012. As such, each of the fractionation system 1005 and the analysis system 1010 can include its own controller 1015 or a single controller 1015 can control both systems 1005 and 1010. The one or more controllers 1015 can include a user interface, one or more processors, memory, data transmission capability, and the like. The controller 1015 can include a processor that may be appropriately pre-programmed or configured to be loaded with an appropriate software program or programs.

The controller 1015 can work in conjunction with a liquid handling system, such as automated robotic arms or samplers 1025 that sample aliquots of the complex mixture to be analyzed. The sample container 1175 holding liquid to be analyzed (e.g., a microtiter plate or an array of vials) can be held in a fixed position and a robotic arm used to sequentially/simultaneously sample the containers. Preferably, the robotic system is capable of presenting samples at a rate that does not limit the throughput of the system 1000. In other implementations, the sipper tubes can be immobilized and each sample container 1175 to be analyzed can be moved into a position where an aliquot can be sampled.

Figure 11:
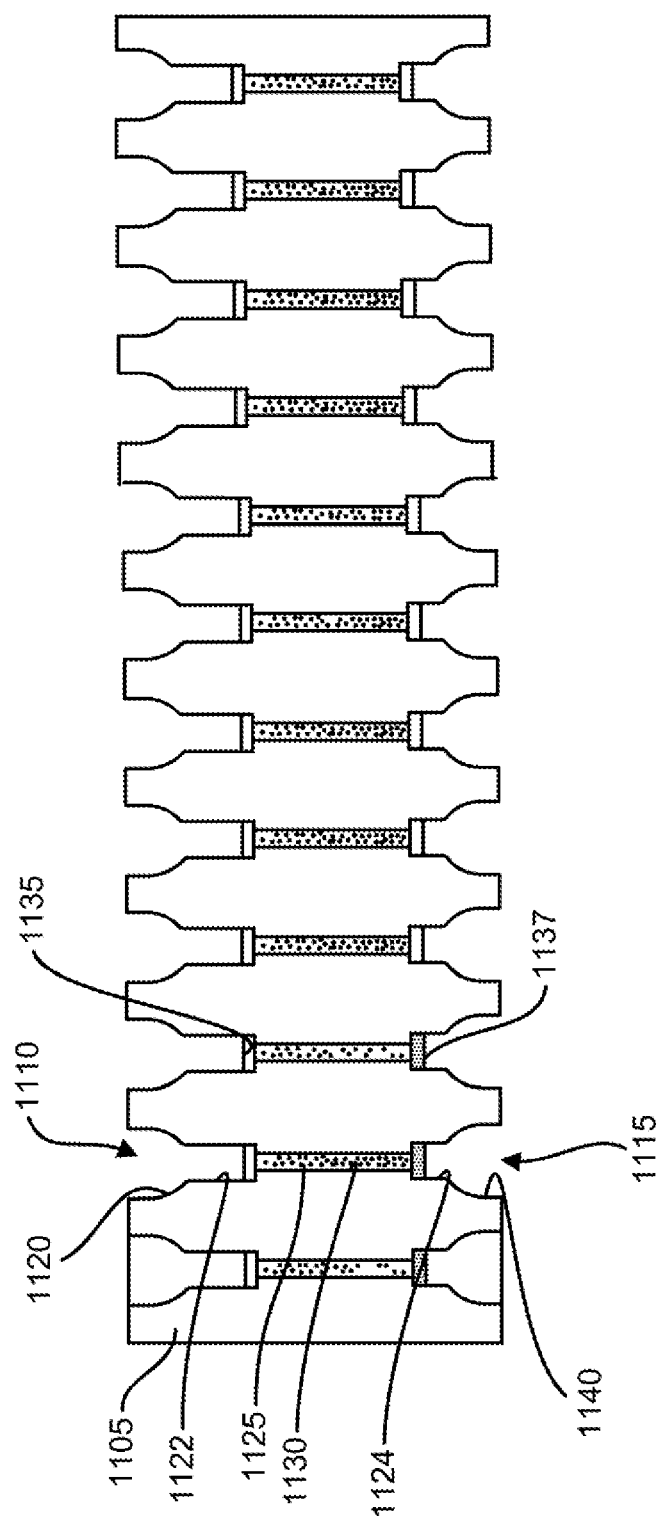
FIG. 11 is a schematic side view of a cartridge comprising an array of columns designed for single-use.

The multiplexed, single-use cartridge 1050 having an array of fractionation columns 1100 (see FIG. 11). Each of the columns 1100 can include an inlet opening 1110 at a proximal end of the body, an outlet opening 1115 at a distal, opposite end of the body, and a metered amount of solid phase 1125 packed therebetween. The inlet opening 1110 can have a first diameter and open into an inlet chamber 1120 configured to receive a fluidic coupler. The inlet chamber 1120 can be funnel-shaped or taper down to a smaller-dimensioned specimen introduction area 1122. The specimen introduction area 1122 can be a cylindrically-shaped region configured to receive a particular volume of liquid specimen therein. The specimen introduction area 1122 is configured to receive sample directly with a pipette tip or other type of disposable injection device inserted through the inlet opening 1110 when the fluidic coupler is withdrawn from engagement with the inlet chamber 1120. In an implementation, a sampler 1025 can be used to add sample to the specimen introduction area 1122, which is described in more detail below.

Still with respect to FIG. 11, the solid phase 1125 can be packed within a cylindrical chamber 1130 defined by an inner diameter of the column body 1105. The cylindrical, solid phase chamber 1130 can extend between a first porous frit 1135 at its proximal end (or at a distal end of the specimen introduction area 1122) and a second porous frit 1137 at its distal, exit end to retain the solid phase 1125 within the solid phase chamber 1130. Downstream of the second porous frit 1137 can be a cylindrically shaped region or analyte exit area 1124. The analyte exit area 1124 opens into an outlet chamber 1140 at the distal end of the column body 1105. The outlet chamber 1140, like the inlet chamber 1120, can be funnel-shaped or tapered such that the smaller diameter analyte exit area 1124 is in fluid communication with the larger diameter outlet opening 1115. The outlet opening 1115 is configured to receive a fluidic coupler.

The column body 1105 can be machined, cast, molded, and/or 3D-printed such that a unitary piece of material defines the body 1105 including at least the inlet opening 1110, inlet chamber 1120, specimen introduction area 1122, solid phase chamber 1130, analyte exit area 124, outlet chamber 1140, and outlet opening 1115 of each of the columns in the array. The array of columns can arranged linearly, circularly, or 2-dimensionally within the unitary body 1105. Each cartridge 1050 can include a plurality of fractionation columns 1100 (e.g. 2, 3, 4, 5, 6, 7, 8, 9, 10, 12, 14, 16, 18, 20, 24) configured to receive and fractionate samples. In a preferred embodiment, the cartridges 1050 contain at least 8 or 16 columns 1100 in parallel. The spacing of the columns 1100 within the body 1105 of the cartridge 1050 can match the spacing of a SBS-standard 96-well microtiter plate (i.e. 9 mm apart). This allows for using standard commercially-available liquid handling robots with the multiplexed fractionation step.

To fractionate samples, the multiplexed, single-use cartridge 1050 is coupled to the fluidic circuit 1004 having a high-pressure pumping system 1020. The pumping system 1020 includes a pump and reservoirs of wash and elution solvents configured to be in fluid communication with an inlet end of the cartridge 1050 by a proximal fluidic coupler, as described elsewhere herein. The proximal fluidic coupler can have a ferrule sized to be inserted through the inlet opening 1110 and positioned within the inlet chamber 1120 of a first column 1100 of the cartridge 1050. The distal fluidic coupler can have a ferrule sized to be inserted through the outlet opening 1115 and positioned within an outlet chamber 1140 of the first column 1100 of the cartridge 1050. Each of the ferrules can have a shape that substantially corresponds to the shape of the chambers 1120, 1140 within which the ferrule is to mate. The couplers can be integral with the pumping system 1020 or installed on an automated column changer having a mechanically actuated stage as described elsewhere herein. The entrance end ferrule can be withdrawn from the inlet chamber 1120 and away from the inlet opening 1110 to allow for sample introduction into the specimen introduction area 1122.

The specimen introduced to the cartridge 1050 can vary, but can include high protein type, original samples (e.g. whole blood, plasma, serum, urine, cerebrospinal fluid (CSF), tissue extracts, environmental, and chemical). The specimen introduced can also include complex mixtures to be analyzed, such as newly synthesized chemicals of a chemical library. As mentioned above, the liquid to be analyzed, such as newly synthesized chemicals, can be stored in sample containers 1175, typically 96-well or 384-well microtiter plates and a liquid handling system or sampler 1025, such as automated robotic arms, can be used with the system 1000 to introduce specimen for fractionation. The specimen also can be introduced manually by the user. For example, a multichannel liquid handling robot can be used to aspirate the liquid specimen from a single row of the specimen plate 1175 and simultaneously transfer all specimen to respective specimen introduction areas 1122 of the multiplexed disposable cartridges 1050. Each column 1100 in the plurality of columns of the cartridge 1050 is thus exposed to the same gradient at the same time. Meaning, that the output of a single pumping system 1020 that generates a set of wash and elution solvents at a ratio that changes over time (e.g. a solvent gradient) can be split (e.g. with a manifold) such that each column 1100 in the multiplexed cartridge 1050 receives substantially the same liquid flow.

Figure 12:
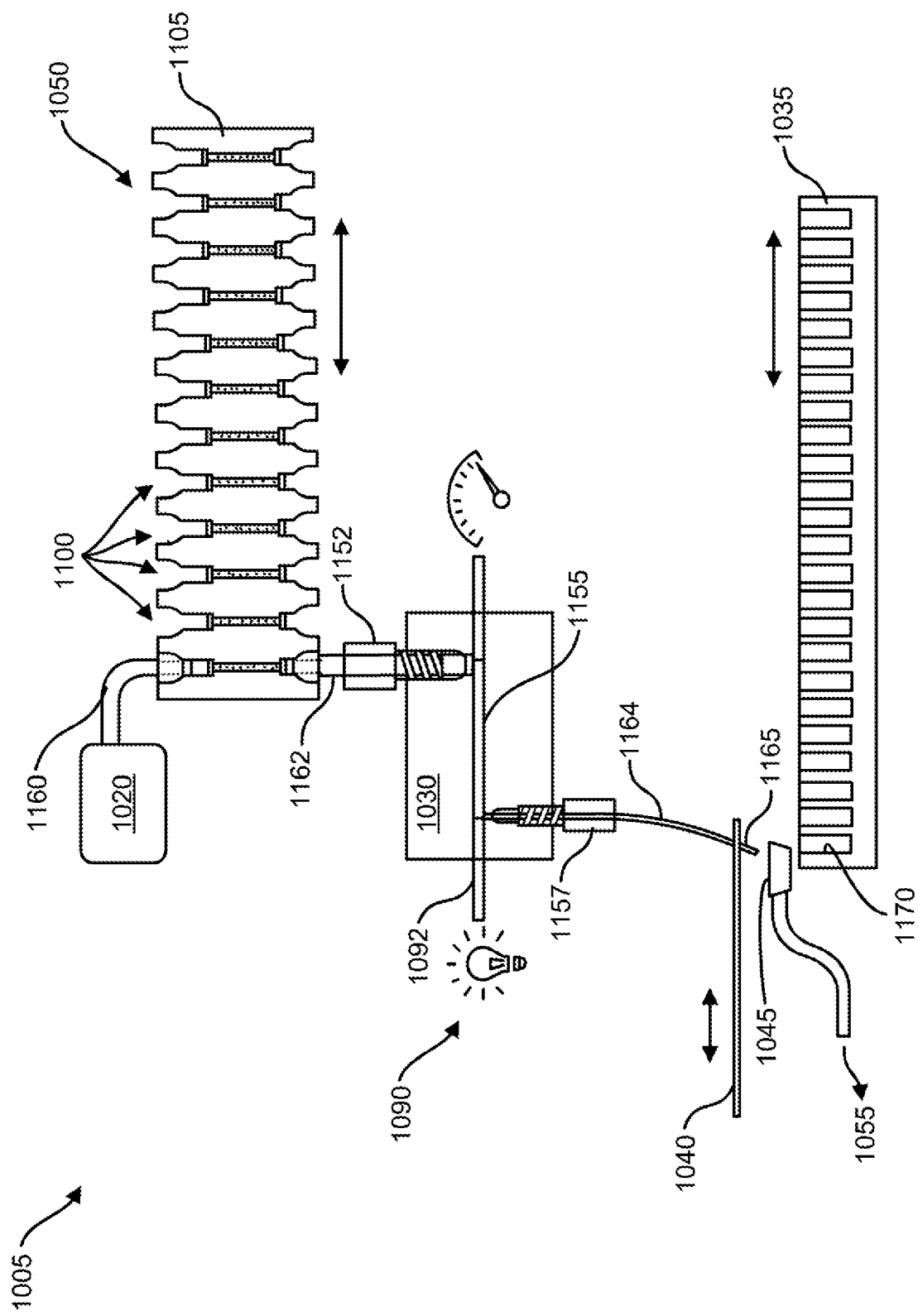
FIG. 12 is a schematic side view of the fractionation system.
Figure 13:
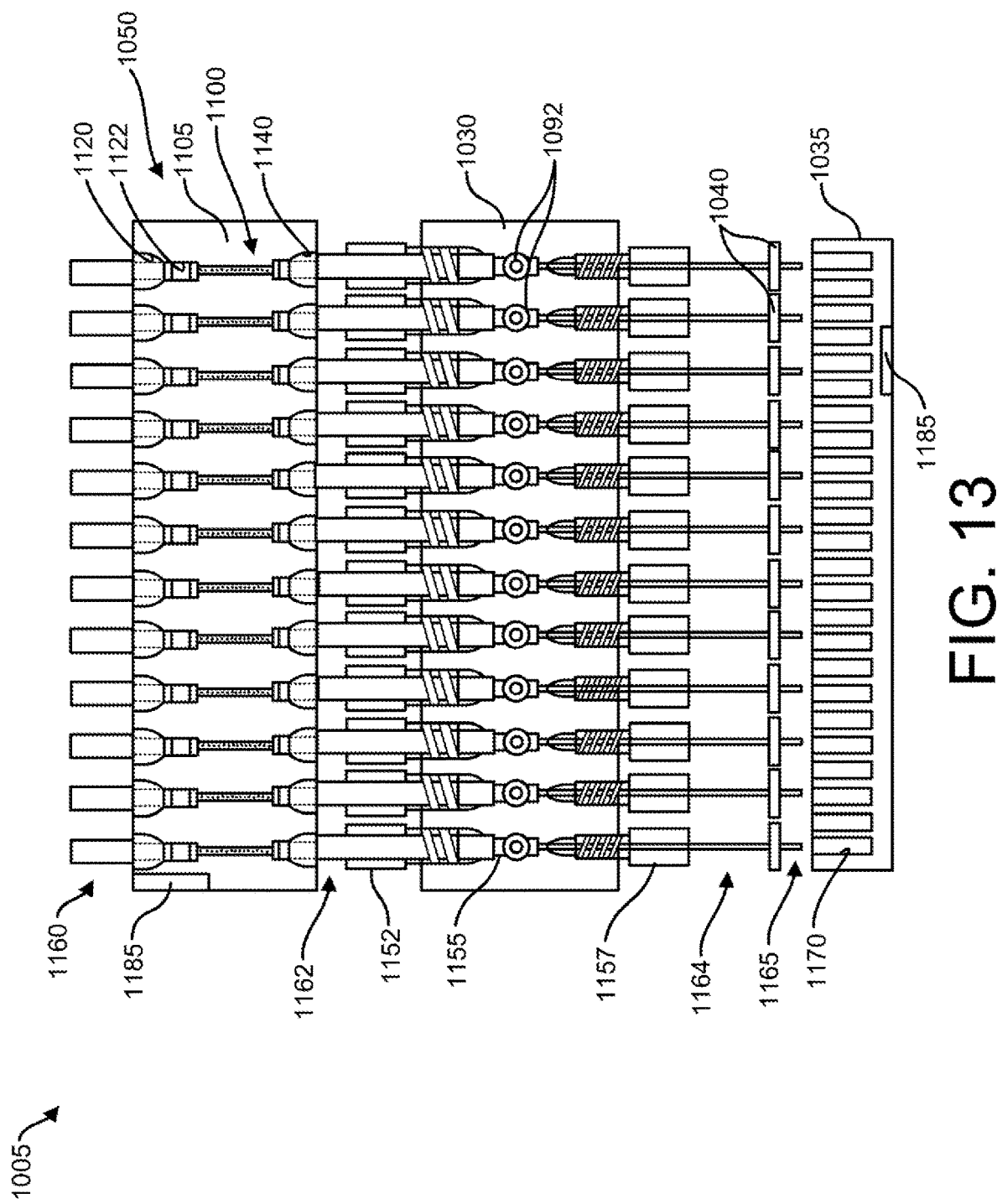
FIG. 13 is a schematic front view of the fractionation system of FIG. 12.

FIG. 12 illustrates a schematic side view of the fractionation system 1005 and FIG. 13 illustrates a schematic front view of the fractionation system 1005. The pumping system 1020, which can include a gradient HPLC pump, can be coupled to the array of columns 1100 within a multiplexed, disposable cartridge 1105. As will be described in more detail below, each of the columns 1100 of the disposable cartridge 1050 can be coupled to a sensor of the detector 1030 and an independently-addressable fraction collector 1035.

The fractionation system 1005 can include flexible tubing 1160 that are in fluidic connection with each of the columns 1100 of the cartridge 1050 at the proximal inlet chamber 1120 and a plurality of flexible tubing 1162 that are in fluidic connection with each of the columns 1100 of the cartridge 1050 at the distal outlet chamber 1140. The tubing 1160 can be proximal of the columns 1100 and configured to communicate with the pumping system 1020 and the tubing 1162 can be distal to the columns 1100 and configured to communicate with the detector 1030. The proximal tubing 1160 can communicate with the wash and elution solvents of the pumping system 1020 to deliver them into the specimen introduction areas 1122 where the solvents mix with any internal standards and specimen added to the specimen introduction areas 1122 before flowing through the proximal frits 1135 into the solid phase chamber 1130 over the immobilized solid phase towards the outlet chamber 1140. Proximal ferrules and distal ferrules can receive the tubing as described elsewhere herein. The tubing 1160, 1162 can be PEEK or TEFLON type tubing.

The columns 1100 need no additional coupling elements detachably secured to either end as is typical with conventional columns. The mating surfaces can be robust enough to provide a leak-free fluidic connection even at the high operating pressures. No conventional specimen introduction apparatus, high-pressure rotary injection valves or other injection valve are needed such that the liquid specimen to be analyzed is directly introduced through the inlet opening 1110 into the specimen introduction areas 1122 upstream from the entrance frit 1135 of the solid phase 1125. The multiplexed, single-use disposable column cartridges 1050 also eliminate the need to flush with high concentration of elution solvent to eliminate any tightly bound compounds from the columns 1100. Sample-to-sample carry-over is no longer an issue.

As mentioned above, the distal tubing 1162 is configured to communicate with the detector 1030 positioned between the outlet end of each column 1100 and the fraction collector 1035. The detector 1030 can include an illumination source or sensor 1090 that is able to detect specific analytes within the specimen by, for example, UV absorption, fluorescence, radioactivity, etc. Fluidic couplers 1152 can be positioned relative to the outlet chambers 1140 of the columns 1100 to direct flow of a fraction towards the flow paths 1155 of the detector 1030. The pumping system 1020 directs flow of the fractions through the flow paths 1155 relative to the sensor 1090 of the detector 1030. In some implementations, the detector 1030 is a UV detector having a single illumination source as the sensor 1090 that is coupled to a multichannel UV flow cell via fiber-optic couplings 1092. The illumination source for the detector 1030 can be provided by low cost sources such as solid state or diode lasers. It should be appreciated that other detectors besides UV can be used, such as a light scattering (LS) detector.

Still with respect to FIGS. 12-13, as each chemical is fractionated by the columns 1100 and eluted from the solid phase, the eluate containing each chemical flows through its respective flow path 1155 of the detector 1030. The presence of the chemical in the eluate can trigger a response from the detector 1030 in real-time. The detected characteristics of the chemical (e.g. UV absorption) being fractionated can be used to direct the collection of the fraction into the fraction collector 1035 (or the waste collector 1045). The fraction collector 1035 is configured to collect a plurality of fractions from each of the columns 1100 of the cartridge 1050 into individual containers or wells 1170. For example, fractions containing compounds with unknown chemical identity can be collected into individual wells of high-throughput plates (e.g. 96-, or 384-well microtiter plates). This allows for the desired fractions to be retained while undesired fractions (i.e. side products or impurities) can be discarded to the waste collector 1045.

The eluate in the flow paths 1155 flow towards fluidic couplers 1157 having tubing 1164 coupled to an actuator 1040. The actuator 1040 can work in coordination with the detector 1030 to direct eluate either to the wells 1170 of the fraction collector 1035 or the waste collector 1045. The position of the tubing 1164 for each of the plurality of columns 1100 relative to the fraction collector 1035 can be independently articulated by the actuator 1040. The actuator 1040, which can be an electromechanical arm, can position the distal end 1165 of the tubing 1164 such that the liquid eluate from the HPLC fractionation is either delivered to a specific well 1170 of the fraction collector 1035 for collecting as a fraction for analysis or to the waste collector 1045. The waste collector 1045 can be coupled to a vacuum line with a trap 1055 to remove the unwanted fractions.

The response of the detector 1030 is based upon whether or not an analyte or chemical is within a particular fraction above a pre-determined limit or threshold. The threshold can vary and can be user-selectable to a pre-determined level. In some implementations, the sensor 1090 is a UV absorption sensor and the threshold is 0.02 Absorbance Units. When the signal from the sensor 1090 indicates an analyte is in the eluate at or above the threshold, the actuator 1040 is moved to a first position such that the eluate from the column 1100 can be collected in a first well 1170 or receptacle of the fraction collector 1035 (see FIGS. 12-13). When the signal from the sensor 1090 indicates an analyte in the eluate is below the threshold following compound elution, the fraction collection is stopped. The actuator 1040 is moved to a second position such that the eluate from the column 1100 is diverted to the waste collector 1045. The fraction collector 1035 is thereby triggered to either collect or discard a particular fraction to a collector well 1170. The actuator 1040 is configured to move the distal ends 1165 of the fraction collection tubing 1164 to positions relative to the waste collector 1045 and wells 1170 of the fraction collector 1035 such that eluate is either collected within a collector well 1170 or diverted to the waste collector 1045. A compound eluted in another fraction in the sample causes the detector 1030 to trigger a second fraction collection into a new container or well 1170. The detector 1030 will direct the actuator 1040 to move the distal ends 1165 of the tubing 1164 to a position where the eluate will be collected into a further collector well 1170.

It should be appreciated that the actuator 1040 is configured to independently articulate at least one of the fraction collector 1035 and the plurality of tubes 1164 to collect liquid eluate from the fractionation. The fraction collector 1035 (e.g. a microtiter plate) can be moved by the actuator 1040 and/or the actuator 1040 can adjust or independently articulate the position of a plurality of tubes 1164 relative to a position of the plurality of wells 1170 of the fraction collector 1035. A position of the plurality of wells 1170 of the fraction collector 1035 relative to a position of the plurality of tubes 1164 can be independently articulated by the actuator 1040.

In an implementation, the samples to be fractioned by the columns 1100 can be stored in microtiter plates as can the fractions collected (see FIG. 12). The samples to be fractioned can be stored in one or more sample source plates 1175 (e.g. 96-well microtiter plate) and the fractions from the columns 1100 can be collected into one or more fraction collection plates 1035 (e.g. 384-well microtiter plate). In this implementation, four individual fractions can be collected for each sample from the source plate 1175. For example, up to four fractions of the sample in well A1 of the source plate 1175 can be collected into wells A1, B1, A2, and B2 of the fraction collection plate 1035 while the sample in well A2 of the source plate 1175 can be collected into wells C1, D1, C2, and D2 of the collection plate 1035 and so on. In this way, up to four fractions from the entire first row of the source plate 1175 can be collected into the first two rows of the collection plate 1035. The source and collection plates 1175, 1035 can be moved by the actuator 1040 such that samples in the second row of the source plate 1175 can be collected within the third and fourth rows of the collection plate 1035 and so on. If needed, more than four fractions per sample can be collected into two or more 384-well collection plates 1035.

The system 1000 greatly improves the speed of the throughput by multiplexing the fraction collection process across a plurality of simultaneous separations and fractions from each sample within the plurality of samples being fractioned that are independently collected in unique receptacles that can later be analyzed by mass spectrometry. As mentioned, the system 1000 can include an analysis system 1010 including an analyzer 1012, configured to fluidically communication with the fractionation system 1005. The individual wells 1170 of the fraction collection plates 1035, each containing a single fraction from each sample, can be assayed independently of the fractionation to verify the chemical identities of each fraction. The analyzer 1012 can be an mass spectrometer (MS). The sample may be presented to the mass spectrometer using a variety of standard systems, including atmospheric pressure chemical ionization (APCI), electrospray ionization (ESI) or atmospheric pressure photoionization (APPI). The mass spectrometer is capable of quantitatively analyzing a large number of compounds based on the mass-to-charge ratio of each compound. Further separation of individual compounds is generally not necessary, since an accurate mass-selective detection and quantification can be performed by mass spectrometry. The output of the MS is analyzed and the amount of compound present in the sample is determined by integrating the area under the MS peak One or more codes 1185 can be positioned on one or more of the specimen plate 1175, cartridge 1050, column 1100, fraction collection plate 1035, as well as individual wells 1170 of the collection plate 1035. The one or more codes 1185 may include color coding, written codes, machine readable codes, electrical signaling codes, or any combination thereof. In some such embodiments, the written codes may include alpha-numeric codes, symbols, or a combination of both. The machine readable codes may include symbols, quick response (QR) codes, barcodes, or any combination thereof. In some embodiments, the electrical signaling codes may include radio frequency (RF) signals. The system 1000 can include a reader configured to read the one or more codes 1185. In some implementation, the codes 1185 can allow for verification that a particular solvent assembly is compatible with the cartridge selected by the user. The system can read the code 1185 on the cartridge 1050 prior to introduction of the sample, after introduction of the sample, before piercing the seals on the solvent assemblies, or any combination thereof. The code 1185 on the solvent assembly can be read by the system before piercing the seals on the assembly, before reading the code 1185 on the cartridge 1050, or after reading the code on the cartridge 1050. The system can alert the user to an incompatibility between the cartridge and solvent assembly with a visual alarm, an audio alarm, or both. The system can also prevent an analysis from progressing when incompatible solvents are detected in the form of an incompatible solvent assembly. The codes 1185 can also be used to identify the sample fractions and where located within a particular fraction collection plate 1035.

In conventional, single-column HPLC-UV-MS applications, both the UV absorption data and the MS data are commonly obtained from the same injection because the analytes are first flowed through a UV cell and then to the mass spectrometer. The two streams of data (UV and MS) obtained serially are collected by a single computer and often both the UV and MS data displayed together during analysis. MS is useful for a qualitative verification of the identity of the various fractions through identification of molecular weight, but does not provide absolute quantitation without proper internal and external calibrators. Since almost all compounds absorb UV light at wavelengths below 210 nm, the intensity of the UV absorption can be used to provide quantitative information about the relative amount of each fraction in the HPLC separation. However, the system 1000 may collect the multiplexed HPLC-UV data and decoupled MS data at different times and, in some implementations, on different computer systems (see FIG. 10). The UV and MS processes are decoupled with collection of the UV data occurring in parallel across multiple samples followed by a rapid, serial MS analysis of the multiple samples. These two decoupled streams of data from the one or more controllers 1015 can be "stitched" or otherwise merged and reintegrated via software such that data from the HPLC fluidic circuit 1004, the detector 1030, and the analyzer 1012 for each fraction are available in a single file to create "individual" HPLC-MS data in a manner that is analogous to conventional HPLC-UV-MS. As mentioned above, one or more codes 1185 such as a bar code or other identifiers, can be used to identify various aspects of the fractionation system 1005 as well as the analyzer system 1010. The one or more controllers 1015 can track and record the codes 1185 of the source plate 1175, identity of individual wells 1170 of the source plate 1175, fraction retention time based on triggering of the detector 1030 by the eluate, codes 1185 of the fraction collection plate 1035, and identity of individual wells 1170 of the fraction collection plate 1035, etc. The software can take the disparate streams of recorded data (i.e. from the HPLC-UV of the fractionation system 1005 decoupled from the MS operations of the analysis system 1010) and merge them using the identifier information to create complete HPLC-MS data for a single fraction.

The subject matter described herein may be embodied in systems, apparatus, methods, and/or articles depending on the desired configuration. For example, the fractionation system (or one or more components therein), the analysis system (or one or more components therein), and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, program code, or code) include machine instructions for a programmable processor, and may be implemented in a high-level procedural and/or object-oriented programming language, and/or in assembly/machine language. As used herein, the phrase "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

To provide for interaction with a user, the subject matter described herein may be implemented on a computer having a display device (e.g., a CRT (cathode ray tube) or LCD (liquid crystal display) monitor and the like) for displaying information to the user and a keyboard and/or a pointing device (e.g., a mouse or a trackball) by which the user may provide input to the computer. For example, this program can be stored, executed and operated by the dispensing unit, remote control, personal computer (PC), laptop, smartphone, media player or personal data assistant ("PDA"). Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Certain embodiments of the subject matter described herein may be implemented in one or more computing systems and/or devices that include a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system according to some such embodiments described above may include clients and servers. A client and server are generally remote from each other and typically interact through a communication network. The relationship of client and server arises by virtue of computer programs running on the respective computers and having a client-server relationship to each other.

For example, such a system may include at least one molecule detecting/identification device, which is in communication (wired or wireless) with at least one controller/processor. The processor may include computer instructions operating thereon for accomplishing any and all of the methods and processes disclosed in the present disclosure. Input/output means may also be included, and can be any such input/output means known in the art (e.g., display, memory, database, printer, keyboard, microphone, speaker, transceiver, and the like). Moreover, in some embodiments, the processor and at least the database can be contained in a personal computer or client computer which may operate and/or collect data from the detecting device. The processor also may communicate with other computers via a network (e.g., intranet, internet).

EXAMPLE 1

A plurality of single-use columns were used to analyze three different specimens to assess the effect of disposing the columns on level of carry-over within the HPLC system. The concentration of the cephalosporin class antibiotic cefazolin from three specimens of serum from three patients was determined using a single-use 1.5 cm×1 mm column containing a C18 solid-phase material coupled to triple quadrupole mass spectrometer acting as the detector or sensor. The column was loaded into the device by removing the fluidic fittings and inserting the column between the fittings while in the first, insertion position. The column was sealed and locked into position by moving the fittings to the second, sealed position. The HPLC pumping system was engaged and the column was washed sequentially for one minute with elution solvent (80% acetonitrile containing 0.1% trifluoroacetic acid) followed by washing for one minute with wash solvent (water containing 0.1% trifluoroacetic acid) at a flow rate of 1.0 mL/minute. Once the column was prepared, the pumping system was disengaged and the fittings were once again moved to the first, insertion position.

A pipettor with a disposable pipette tip was used to aspirate sequentially 2 uL of an aqueous solution containing a stable isotope of cefazolin serving as the internal standard and an 8 uL aliquot of the serum specimen. The mixture of internal standard and specimen was transferred to the specimen introduction area within the disposable HPLC column between the entrance frit and the entrance end fluidic fitting. The fluidic fittings were then moved to the second, sealed position to complete a fluidic circuit between the pumping system, specimen and internal standard, HPLC column, and mass spectrometer sensor. The pumping system was reengaged and delivered a 1.0 mL/minute gradient of wash and elution solvents to the column starting with 100% wash solvent and ending in a 40% wash solvent+60% elution solvent mixture after 6 minutes (i.e. a 10% per minute gradient).

The pumping system was disengaged and the fluidic fittings were removed to the first, insertion position. The first disposable HPLC column was discarded and a new column was placed in the device. The above protocol was followed for a second and third time for the analysis of all three specimens. The cefazolin analyte and stable isotope cefazolin internal standard eluted from the solid-phase at a mixture of 40% elution solvent and were detected by the mass spectrometer operating in multiple-ion monitoring mode. The mass spectrometer peak areas were used to quantify the concentration of cefazolin in the specimen.

Only the fluidic connection between the exit end of the column and the mass spectrometer were reused. Thus, carryover from one specimen to the next was virtually eliminated using the disposable columns since substantially all of the fluidic components that were exposed to the specimen were single-use. The columns were disposed between each analysis and there was no need to run the elution gradient to 100% in an attempt to wash out traces of analyte nor was there the need to recondition the column prior to the next specimen. Together, this saved significant amount of instrument time for each analysis. Absolutely no sample preparation was required for the analyses. Proteins in the specimen were not removed through protein precipitation, filtration or dialysis prior to analysis despite the fact the organic solvent used to elute the cefazolin analyte from the column causes the protein in the sample to precipitate.

It should be appreciated that the cartridges described herein can include a plurality of columns, each of which are arranged relative to their own respective fluidic circuit or flow path. For the sake of simplicity, description of one column and its respective fluidic circuit or flow path is intended to be applicable to any of a plurality of columns having their own respective fluidic circuits or flow paths except where explicitly described otherwise and will not necessarily be repeated throughout. Also, use of the terms "first," "second," "third" and so on are not intended to be limiting.

In various implementations, description is made with reference to the figures. However, certain implementations may be practiced without one or more of these specific details, or in combination with other known methods and configurations. In the description, numerous specific details are set forth, such as specific configurations, dimensions, and processes, in order to provide a thorough understanding of the implementations. In other instances, well-known processes and manufacturing techniques have not been described in particular detail in order to not unnecessarily obscure the description. Reference throughout this specification to "one embodiment," "an embodiment," "one implementation, "an implementation," or the like, means that a particular feature, structure, configuration, or characteristic described is included in at least one embodiment or implementation. Thus, the appearance of the phrase "one embodiment," "an embodiment," "one implementation, "an implementation," or the like, in various places throughout this specification are not necessarily referring to the same embodiment or implementation. Furthermore, the particular features, structures, configurations, or characteristics may be combined in any suitable manner in one or more implementations.

The use of relative terms throughout the description may denote a relative position or direction. For example, "distal" may indicate a first direction away from a reference point. Similarly, "proximal" may indicate a location in a second direction opposite to the first direction. However, such terms are provided to establish relative frames of reference, and are not intended to limit the use or orientation of a system to a specific configuration described in the various implementations.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

What is claimed:

1. A fractionation system for analyzing one or more molecules of interest in a liquid specimen, the fractionation system comprising:
    a monolithic body defining a plurality of fractionation columns, each fractionation column comprising:
    an inlet chamber at a proximal end of the fractionation column;
    an outlet chamber at a distal, opposite end of the fractionation column; and
    a solid phase chamber extending between the inlet chamber and the outlet chamber packed with a metered amount of solid phase constrained between a first porous frit and a second porous frit,
    wherein the inlet chambers of each of the plurality of fractionation columns are configured to be in fluid communication with a pumping system via proximal tubing, wherein the outlet chambers of each of the plurality of fractionation columns are configured to direct eluate from the solid phase chamber toward distal tubing, and wherein respective ends of the proximal tubing press up against the first porous frit of each of the plurality of fractionation columns and respective ends of the distal tubing press up against the second porous frit of each of the plurality of fractionation columns when a fluidic circuit through the fractionation system is established.

2. The system of claim 1, wherein each of the plurality of fractionation columns is configured to be exposed simultaneously to a single pump gradient of liquid flow from the pumping system.

3. The system of claim 1, wherein the monolithic body is formed of a bio-inert polymeric material that is polyetheretherketone (PEEK), polypropylene, or polystyrene.

4. The system of claim 1, further comprising a liquid handling system that samples aliquots of the liquid specimen to be fractionated, wherein the liquid specimen is contained within a microtiter specimen plate having a plurality of wells, wherein the plurality wells includes 96 wells or 384 wells.

5. The system of claim 1, further comprising:
a detector having at least one sensor arranged relative to a multichannel flow pathway;
a fraction collector having a plurality of wells; and
an actuator operably coupled to the detector and the fraction collector, wherein the actuator is configured to direct flow of the eluate from the multichannel flow pathway of the detector towards the fraction collector based on a level of the one or more molecules of interest detected by the detector.

6. The system of claim 5, wherein the actuator is configured to move to a first position to direct the flow of the eluate towards a first well of the plurality of wells of the fraction collector when the level of the one or more molecules of interest detected by the detector is at or above a threshold.

7. The system of claim 6, wherein the threshold is pre-determined and user-selectable, optionally wherein the detector detects UV absorption and the threshold is 0.02 Absorbance Units.

8. The system of claim 6, wherein the actuator is configured to move to a second position to divert the flow of the eluate towards a waste collector when the level of the one or more molecules of interest detected by the detector is below the threshold.

9. The system of claim 8, wherein the actuator is configured to move to a third position to direct the flow of the eluate towards a second well of the plurality of wells of the fraction collector when the level of the one or more molecules of interest detected by the detector is once again at or above the threshold.

10. The system of claim 5, wherein the plurality of wells of the fraction collector are independently addressable.

11. The system of claim 5, wherein the fraction collector is movable by the actuator.

12. The system of claim 5, wherein the fraction collector is a microtiter plate, and the plurality of wells are arranged in an array of at least 96 wells in the microtiter plate.

13. The system of claim 5, wherein a plurality of tubes extend from the multichannel flow pathway of the detector, the plurality of tubes coupled to the actuator, wherein a position of the plurality of tubes relative to a position of the plurality of wells of the fraction collector is independently articulated by the actuator, wherein a position of the plurality of wells of the fraction collector relative to a position of the plurality of tubes is independently articulated by the actuator.

14. The system of claim 13, wherein the actuator is configured to independently articulate at least one of the fraction collector and the plurality of tubes.

15. The system of claim 1, wherein the monolithic body is a single-use disposable device configured for high pressure liquid chromatography.

16. The system of claim 1, wherein the monolithic body is machined, cast, molded, and/or 3D-printed to define the plurality of fractionation columns.

17. The system of claim 1, wherein the monolithic body is formed of metal, resin, polymer, or a combination thereof.

18. The system of claim 1, wherein the solid phase chamber is cylindrical and the first and second porous frits are disc-shaped, and wherein the solid phase chamber has an inner diameter configured to receive the outer diameters of each of the first and second porous frits, wherein the outer diameter of the first and second porous frits is larger than the inner diameter of the solid phase chamber wherein the first and second porous frits are positioned.

19. The system of claim 1, wherein the inlet chamber is configured to receive a proximal fluidic coupler and the outlet chamber is configured to receive a distal fluidic coupler, the proximal and distal fluidic couplers being part of an High Performance Liquid Chromatography (HPLC) system, wherein a compression force applied by the proximal and distal fluidic couplers create a seal with the inlet and outlet chambers there by preventing leakage during use of the device with the HPLC system.

20. The system of claim 19, wherein inserting the proximal fluidic coupler and distal fluidic coupler into the inlet chamber and outlet chamber, respectively, creates a non-threaded sealed coupling between the fractionation column and the HPLC system.

* * * * *